US012337877B2

(12) United States Patent
Bagnell et al.

(10) Patent No.: US 12,337,877 B2
(45) Date of Patent: Jun. 24, 2025

(54) SYSTEMS AND METHODS RELATED TO CONTROLLING AUTONOMOUS VEHICLE(S)

(71) Applicant: Aurora Operations, Inc., Pittsburgh, PA (US)

(72) Inventors: James Andrew Bagnell, Pittsburgh, PA (US); Sanjiban Choudhury, Pittsburgh, PA (US); Venkatraman Narayanan, Mountain View, CA (US); Arun Venkatraman, Mountain View, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

(21) Appl. No.: 18/582,149

(22) Filed: Feb. 20, 2024

(65) Prior Publication Data

US 2024/0190477 A1 Jun. 13, 2024

Related U.S. Application Data

(63) Continuation of application No. 17/522,031, filed on Nov. 9, 2021, now Pat. No. 11,952,015.

(51) Int. Cl.
*B60W 60/00* (2020.01)
*B60W 50/00* (2006.01)
*G06N 20/00* (2019.01)
*G06V 20/58* (2022.01)

(52) U.S. Cl.
CPC ........ *B60W 60/0027* (2020.02); *B60W 50/00* (2013.01); *B60W 60/0011* (2020.02); *G06N 20/00* (2019.01); *G06V 20/584* (2022.01)

(58) Field of Classification Search
CPC ...... B60W 50/00; G06N 20/00; G06V 20/584
See application file for complete search history.

(56) References Cited

U.S. PATENT DOCUMENTS

| | | | |
|---|---|---|---|
| 10,860,022 B2 * | 12/2020 | Korchev | ............... B60W 10/20 |
| 11,200,679 B1 | 12/2021 | Li et al. | |
| 11,629,502 B1 | 4/2023 | Smitchko | |
| 2019/0317496 A1 | 10/2019 | Korchev et al. | |
| 2021/0181754 A1 * | 6/2021 | Cui | ........................ G06N 3/088 |
| 2021/0248460 A1 * | 8/2021 | Sykora | ..................... G06N 3/08 |
| 2022/0145236 A1 | 5/2022 | Gau et al. | |

OTHER PUBLICATIONS

Gao, Jiyang et al; VectorNet: Encoding HD Maps and Agent Dynamics from Vectorized Representation; dated May 8, 2020.

\* cited by examiner

*Primary Examiner* — Tan Q Nguyen
(74) *Attorney, Agent, or Firm* — Gray Ice Higdon

(57) ABSTRACT

Implementations process, using machine learning (ML) layer(s) of ML model(s), actor(s) from a past episode of locomotion of a vehicle and stream(s) in an environment of the vehicle during the past episode to forecast associated trajectories, for the vehicle and for each of the actor(s), with respect to a respective associated stream of the stream(s). Further, implementations process, using a stream connection function, the associated trajectories to forecast a plurality of associated trajectories, for the vehicle and each of the actor(s), with respect to each of the stream(s). Moreover, implementations iterate between using the ML layer(s) and the stream connection function to update the associated trajectories for the vehicle and each of the actor(s). Implementations subsequently use the ML layer(s) in controlling an AV.

20 Claims, 14 Drawing Sheets

FIG. 3C First Iteration

| YIELDER \ YIELDEE | $A_1$ | $A_2$ | $A_3$ |
|---|---|---|---|
| $A_1$ |  | NO YIELD | NO YIELD |
| $A_2$ | NO YIELD |  | NO YIELD |
| $A_3$ | NO YIELD | NO YIELD |  |

FIG. 3D Second Iteration

| YIELDER \ YIELDEE | $A_1$ | $A_2$ | $A_3$ |
|---|---|---|---|
| $A_1$ |  | YIELD | NO YIELD |
| $A_2$ | NO YIELD |  | NO YIELD |
| $A_3$ | NO YIELD | NO YIELD |  |

FIG. 3E Third Iteration

| YIELDER \ YIELDEE | $A_1$ | $A_2$ | $A_3$ |
|---|---|---|---|
| $A_1$ |  | YIELD | NO YIELD |
| $A_2$ | YIELD |  | NO YIELD |
| $A_3$ | YIELD | YIELD |  |

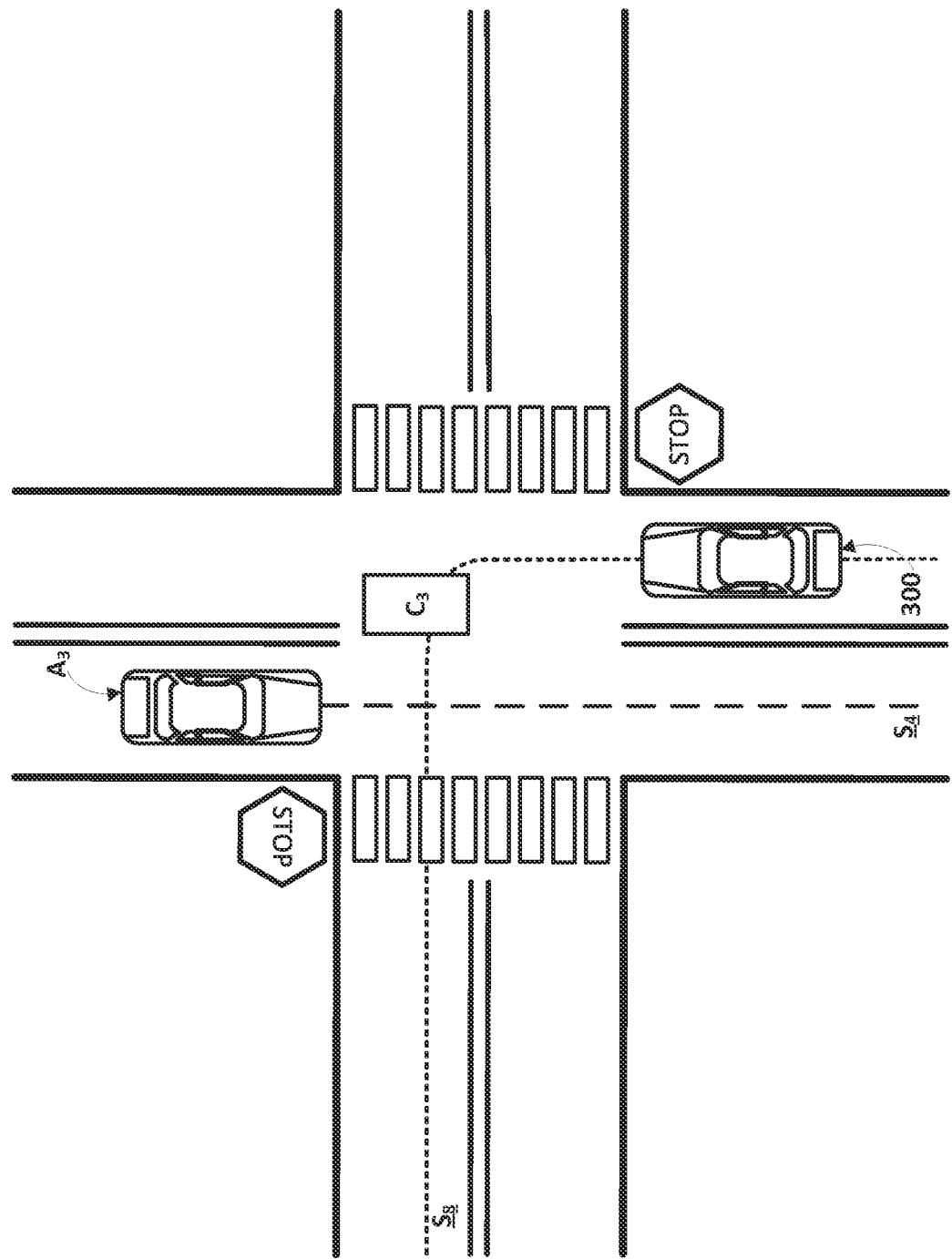

SYSTEMS AND METHODS RELATED TO CONTROLLING AUTONOMOUS VEHICLE(S)

BACKGROUND

As computing and vehicular technologies continue to evolve, autonomy-related features have become more powerful and widely available, and capable of controlling vehicles in a wider variety of circumstances. The automotive industry has generally adopted SAE International standard J3016, which designates 6 levels of autonomy. A vehicle with no autonomy is designated as Level 0. With Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle based on the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

As used herein, the term actor refers to any actor in an environment of a vehicle during an episode (e.g., past or current) of locomotion of the vehicle (e.g., an autonomous vehicle (AV), a non-AV retrofitted with sensors, or a simulated vehicle). For example, the actor may correspond to an additional vehicle navigating in the environment of the vehicle, an additional vehicle parked in the environment of the vehicle, a pedestrian, a bicyclist, or other static or dynamic objects encountered in the environment of the vehicle. In some implementations, actors may be restricted to dynamic objects. Further, the actors may be associated with a plurality of features. The plurality of features can include, for example, velocity information (e.g., historical, current, or predicted future) associated with the actor, distance information between the actor and each of a plurality of streams in the environment of the vehicle, pose information (e.g., location information and orientation information), or any combination thereof. In some implementations, the plurality of features may be specific to the actors. For example, the distance information may include a lateral distance or a longitudinal distance between a given actor and a closest additional actor, and the velocity information may include the velocity of the given actor and the additional actor along a given stream. In some additional or alternative implementations, the plurality of features may be relative to the vehicle. For example, the distance information may include a lateral distance or longitudinal distance between each of a plurality of actors in the environment and the vehicle, and the velocity information may include relative velocities of each of the plurality of actors with respect to the vehicle. As described herein, these features can include those generated by determining geometric relationships between actors, and can be features that are processed using one or more machine learning (ML) layers of one or more ML models described herein. In some implementations, multiple actors are generally present in the environment of the vehicle, and the actors can be captured in sensor data instances of sensor data generated by one or more sensors of the vehicle.

As used herein, the term stream refers to a sequence of poses representing a candidate navigation path, in the environment of the vehicle, for the vehicle or the corresponding additional actors. The streams can be one of a plurality of disparate types of streams. The types of streams can include, for example, a target stream corresponding to the candidate navigation path the vehicle is following or will follow within a threshold amount of time, a joining stream corresponding to any candidate navigation path that merges into the target stream, a crossing stream corresponding to any candidate navigation path that is transverse to the target stream, an adjacent stream corresponding to any candidate navigation path that is parallel to the target stream, an additional stream corresponding to any candidate navigation path that is one-hop from the joining stream, the crossing stream, or the adjacent stream, or a null stream that corresponds to additional actors in the environment that are capable of moving, but did not move in the past episode of locomotion (e.g., parked vehicle, sitting pedestrian, etc.), or corresponds to additional actors in the environment that are not following a previously mapped stream with respect to the target stream or any other stream (e.g., pulling out of the driveway, erratic driving through an intersection, people jaywalking, etc.). In some implementations, as the vehicle progresses throughout the environment, the target stream may dynamically change. As a result, each of the other types of streams in the environment may also dynamically change since they are each defined relative to the target stream.

As used herein, the term trajectory refers to a predicted navigation path of the vehicle (e.g., an AV, a non-AV retrofitted with sensors, or a simulated vehicle) or an actor in the environment of the vehicle. The trajectory can include, for example, one or more locations along the predicted navigation path over a duration of time. Accordingly, the trajectory can define locations as well as associated velocities, accelerations, etc. In some implementations, the trajectory can be forecast along one or more streams identified in the environment of the vehicle. For example, if the vehicle is navigating along a first stream and an additional vehicle is navigating along a second stream, then the trajectory of the vehicle can be forecast with respect to the first stream and the trajectory of the additional vehicle can be forecast with respect to the second stream. In this example, the trajectories can be generated based on processing a plurality of actors and the plurality of streams using one or more of the ML layers described herein. In some versions of those implementations, the trajectories can be further forecast with respect to other streams identified in the environment of the vehicle. Continuing with the above example, the trajectory of the vehicle can additionally be forecast with respect to the second stream and the trajectory of the additional vehicle can additionally be forecast with respect to the first stream. In this example, the trajectories can be additionally forecast with respect to the other streams based on processing the trajectories using a stream connection function described herein. The trajectories for the vehicle and for the additional actors can be iteratively updated as described herein, and can be utilized in controlling the vehicle.

As used herein, the term right-of-way refers to whether any given type of stream has priority over the target stream. There can be multiple types of right-of-way including, for example, a reported right-of-way and an inferred right-of-way. The reported right-of-way is based on traffic signs, traffic lights, traffic patterns, or any other explicit indicator that can be perceived in the environment of the vehicle (e.g., based on sensor data generated by one or more sensors of the vehicle), and that gives priority to the vehicle or an additional actor. For instance, the reported right-of-way can be based on a state of a given traffic light (i.e., red, yellow, green), a yield sign, a merging lane sign, a walking sign, and so on. In contrast with the reported right-of-way, the inferred right-of-way that is based on a state of the vehicle, or more particularly, a control state of the vehicle. For instance, the inferred right-of-way of the vehicle can indicate that the vehicle should yield to a merging vehicle if the merging vehicle is in front of the vehicle on a merging stream and if the vehicle is not accelerating.

As used herein, the term decider refers to a learned or engineered function that makes a corresponding decision with respect to the vehicle or a given actor. A plurality of different deciders can be utilized to make a plurality of distinct corresponding decisions based on one or more of a vehicle, a plurality of actors in an environment of the vehicle, or a plurality of streams in the environment of the vehicle. For example, a yield decider can be utilized to determine whether the vehicle should yield, a merge decider can be utilized to determine whether the vehicle should merge, a joining stream decider can be utilized to determine whether a given actor is merging into a target stream of the vehicle, a crossing stream decider can be utilized to determine whether a given actor is crossing the target stream of the vehicle, and so on for a plurality of additional or alternative decisions. In some implementations, a plurality of actors and a plurality of streams can be processed, using one or more layers of a ML model, to generate predicted output associated with each of the plurality of actors. Further, the predicted output associated with each of the plurality of actors can be processed, using additional layers of one or more of the ML models, to make the corresponding decisions. In these implementations, each of the deciders can correspond to the additional layers of one or more of the ML models, or a subset thereof. For example, the one or more additional layers may correspond to each of the deciders such that the predicted output generated may include vehicle control strategies or vehicle control commands. In this example, the predicted output need not be further processed to be utilized in controlling the vehicle. In contrast, first additional layers may correspond to a yield decider, second additional layers may correspond to a merge decider, third additional layers may correspond to a joining stream decider, and so on. In this example, the predicted output of each of the individual deciders may be processed to rank or prune vehicle control strategies or vehicle control commands, and then a given vehicle control strategy or given vehicle control commands may be selected to be utilized in controlling the vehicle.

As used herein, the phrase episode of locomotion refers to an instance of a vehicle navigating through an environment autonomously, semi-autonomously, or non-autonomously. Driving data can be generated by sensors of the vehicle during the episode of locomotion. The driving data can include, for example, one or more actors captured during a given past episode of locomotion of a vehicle, and that are specific to the given past episode, one or more streams associated with the vehicle or the one or more actors during the given past episode of locomotion, and other data generated by one or more sensors of the vehicle during the episode of locomotion. As used herein, the phrase past episode of locomotion refers to a past instance of the vehicle navigating through the environment or another environment autonomously, semi-autonomously, or non-autonomously.

Consistent with one aspect of the invention, a method for training a machine learning (ML) model for use by an autonomous vehicle is described herein. The method may include: identifying, based on sensor data from one or more sensors of the autonomous vehicle, a plurality of actors in an environment of the autonomous vehicle; and identifying, based on the plurality of actors in the environment of the autonomous vehicle, a plurality of streams. Each stream of the plurality of streams representing a candidate navigation path for the autonomous vehicle or for one or more of the plurality of actors in the environment of the autonomous vehicle. The method further includes processing, using one or more ML layers of one or more of the trained ML models, the plurality of actors and the plurality of streams to generate trajectories for the autonomous vehicle and for each of the plurality of actors, each of the trajectories being forecast with respect to a stream of the plurality of streams. The method further includes, for a plurality of iterations, processing, using a stream connection function, the trajectories for the autonomous vehicle and for each of the plurality of actors to forecast each of the trajectories with respect to each stream of the plurality of streams; and processing, using one or more of the ML layers, the trajectories that are forecast with respect to each of the streams to update each of the trajectories with respect to the respective stream. The method further includes, subsequent to processing the trajectories for the plurality of iterations: determining, based on the trajectories, one or more predicted outputs; and causing the autonomous vehicle to be controlled based on the one or more predicted outputs generated using one or more of the ML layers.

These and other implementations of technology disclosed herein can optionally include one or more of the following features.

In some implementations, the method further includes processing, using one or more additional ML layers of one or more of the trained ML models, the one or more predicted outputs to generate one or more further predicted outputs. Causing the autonomous vehicle to be controlled based on the one or more predicted outputs generated using one or more of the ML layers may include causing the autonomous vehicle to be controlled based on the one or more further predicted outputs generated using one or more of the additional ML layers that are generated based on the one or more predicted outputs.

In some versions of those implementations, the one or more additional ML layers of one or more of the trained ML models may correspond to one of a plurality of disparate deciders, and wherein the further output comprises a decision made by each decider, of the plurality of disparate deciders, for each of the plurality of streams and with respect to each of the plurality of actors.

In some further versions of those implementations, the method may further include obtaining, from one or more databases, a list of autonomous vehicle control strategies or autonomous vehicle control commands.

In yet further versions of those implementations, the method may further include ranking the autonomous vehicle control strategies or the autonomous vehicle control commands, included in the list, based on the decision made by each of the plurality of disparate deciders. Causing the autonomous vehicle to be controlled based on the one or more further predicted outputs generated using one or more of the additional ML layers of one or more of the trained ML models may include causing the autonomous vehicle to be controlled based on a highest ranked autonomous vehicle control strategy or highest ranked autonomous vehicle control commands.

In even yet further versions of those implementations, the method may further include pruning the autonomous vehicle control strategies or the autonomous vehicle control commands, from the list, based on the decision made by each of the plurality of disparate deciders. Causing the autonomous vehicle to be controlled based on the further output generated using one or more of the additional ML layers of one or more of the trained ML models may include causing the autonomous vehicle to be controlled based on a remaining ranked autonomous vehicle control strategy or remaining autonomous vehicle control commands.

In some implementations, the one or more predicted outputs may include an autonomous vehicle control strategy or autonomous vehicle control commands. Causing the autonomous vehicle to be controlled based on the one or more predicted outputs may include causing the autonomous vehicle to be controlled based on the autonomous vehicle control strategy or autonomous vehicle control commands.

In some versions of those implementations, the autonomous vehicle control strategy may include at least one of: a yield strategy, a merge strategy, a turning strategy, a traffic light strategy, an accelerating strategy, a decelerating strategy, or a constant velocity strategy.

In some further versions of those implementations, the autonomous vehicle control commands may include a magnitude corresponding to at least one of: a velocity component, an acceleration component, or a steering component.

In some implementations, processing the plurality of actors and the plurality of streams to generate the trajectories for the autonomous vehicle and each of the plurality of actors may include processing, using one or more of the ML layers, the plurality of actors and the plurality of streams to generate the trajectory for a first actor, of the plurality of actors, that forecasts the trajectory, for the first actor, with respect to a first stream that corresponds to the stream for the first actor; processing, using one or more of the ML layers, the plurality of actors and the plurality of streams to generate the trajectory for a second actor, of the plurality of actors and that is in addition to the first actor, that forecasts the trajectory, for the second actor, with respect to a second stream that corresponds to the stream for the second actor and that is in addition to the first stream; and processing, using one or more of the ML layers, the plurality of actors and the plurality of streams to generate the trajectory for the autonomous vehicle that forecasts the trajectory, for the autonomous vehicle, with respect to a third stream that corresponds to the stream for the autonomous vehicle and that is in addition to both the first stream and the second stream.

In some versions of those implementations, for a first iteration, of the plurality of iterations, processing the trajectories for the autonomous vehicle and each of the plurality of actors to forecast each of the trajectories with respect to each of the streams may include processing, using the stream connection function, the trajectory, for the first actor, to additionally forecast the trajectory, for the first actor, with respect to the second stream and the third stream, resulting in a plurality of first actor trajectories that are forecast with respect to each of the first stream, the second stream, and the third stream; processing, using the stream connection function, the trajectory, for the second actor, to additionally forecast the trajectory, for the second actor, with respect to the first stream and the third stream, resulting in a plurality of second actor trajectories that are forecast with respect to each of the first stream, the second stream, and the third stream; and processing, using the stream connection function, the trajectory, for the autonomous vehicle, to additionally forecast the trajectory, for the autonomous vehicle, with respect to the first stream and the second stream, resulting in a plurality of autonomous vehicle trajectories that are forecast with respect to each of the first stream, the second stream, and the third stream.

In some further versions of those implementations, for the first iteration, processing the trajectories to update each of the trajectories with respect to the stream may include processing, using one or more of the ML layers, the plurality of first actor trajectories, the plurality of second actor trajectories, and the plurality of autonomous vehicle trajectories to update, in parallel, the trajectories. Updating the trajectories may include updating the trajectory, for the first actor, and with respect to the first stream, updating the trajectory, for the second actor, and with respect to the second stream, and updating the trajectory, for the autonomous vehicle, and with respect to the third stream.

In yet further versions of those implementations, updating the trajectory, for the first actor, and with respect to the first stream may include comparing, in a pairwise manner, each of the plurality of first actor trajectories, the plurality of second actor trajectories, and the plurality of autonomous vehicle trajectories; updating the trajectory, for the first actor, and with respect to the first stream based on the comparing; updating the trajectory, for the second actor, and with respect to the second stream based on the comparing; and updating the trajectory, for the autonomous vehicle, and with respect to the third stream based on the comparing.

In even yet further versions of those implementations, updating the trajectory, for the first actor, and with respect to the first stream based on the comparing may include determining, based on the comparing, features of the trajectories, for the second actor and the autonomous vehicle, that are relevant to the trajectory for the first actor; and updating the trajectory, for the first actor, and with respect to the first stream based on the features of the trajectories, for the second actor and the autonomous vehicle, that are relevant to the trajectory for the first actor.

In some even yet further versions of those implementations, updating the trajectory, for the second actor, and with respect to the second stream based on the comparing may include determining, based on the comparing, the features of the trajectories, for the first actor and the autonomous vehicle, that are relevant to the trajectory for the second actor; and updating the trajectory, for the second actor, and with respect to the second stream based on the features of the trajectories, for the first actor and the autonomous vehicle, that are relevant to the trajectory for the second actor.

In some even yet further versions of those implementations, updating the trajectory, for the autonomous vehicle, and with respect to the third stream based on the comparing may include determining, based on the comparing, features of the trajectories, for the first actor and the second actor, that are relevant to the trajectory for the autonomous vehicle; and updating the trajectory, for the autonomous vehicle, and with respect to the third stream based on the features of the trajectories, for the first actor and the second actor, that are relevant to the trajectory for the autonomous vehicle.

In some implementations, determining the one or more predicted outputs may include determining one or more predicted autonomous vehicle constraints that increase a cost of future motion of the autonomous vehicle or that restrict future motion of the autonomous vehicle based on the trajectories for each of the plurality of actors at a final iteration.

In some versions of those implementations, the one or more autonomous vehicle constraints that increase the cost of future motion of the autonomous vehicle or that restrict the future motion of the autonomous vehicle include one or more of: one or more locational constraints that restrict where the autonomous vehicle can be located in the environment, or one or more temporal constraints that restrict when the autonomous vehicle can perform the future motion in the environment.

In some implementations, a quantity of the plurality of iterations may be a fixed integer. In additional or alternative implementations, a quantity of the plurality of iterations may be dynamic. In some versions of those implementations, the method may further include determining the quantity of the plurality of iterations based on one or more of: a quantity of the corresponding additional actors associated with the plurality of actors in the environment of the autonomous vehicle; or a quantity of the candidate navigation paths represented by the plurality of streams in the environment of the autonomous vehicle.

In some implementations, the one or more of the ML layers may be ML layers of a transformer ML model or graph neural network ML model that include at least one or more attention function layers that are attentioned to one or more streams of the plurality of streams.

In some implementations, each stream, of the plurality of streams, is at least one of: a target stream associated with the candidate navigation path the autonomous vehicle will follow, a joining stream that merges into the target stream, a crossing stream that is transverse to the target stream, an adjacent stream that is parallel to the target stream, an additional stream that is one-hop from the joining stream, the crossing stream, or the adjacent stream, or a null stream that is not previously mapped with respect to the target stream or any other stream. In some versions of those implementations, for a first iteration, of the plurality of iterations, each of the plurality of streams may be designated as being one or more of: the target stream, the joining stream, the crossing stream, the adjacent stream, the additional stream, or the null stream. In some further versions of those implementations, for a second iteration, of the plurality of iterations, and subsequent to the second iteration, the designations for one or more of the plurality of streams may be updated based on the updated trajectories.

In some implementations, each of the corresponding additional actors associated with the plurality of actors may correspond to one of: an additional vehicle that is in addition to the autonomous vehicle, a bicyclist, or a pedestrian.

In some implementations, processing the trajectories for the autonomous vehicle and for each of the plurality of actors to forecast each of the trajectories with respect to each stream of the plurality of streams using the stream connection function may cause a frame of reference of each of the trajectories to be shifted to one or more additional frames of reference of the other trajectories.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), tensor processing unit(s) (TPU(s), or any combination thereof) to perform a method such as one or more of the methods described herein. Yet other implementations can include a system of one or more servers that include one or more processors operable to execute stored instructions to perform a method such as one or more of the methods described herein.

The above description is provided as an overview of some implementations of the present disclosure. Further description of those implementations, and other implementations, are described in more detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A, FIG. 3B, FIG. 3C, FIG. 3D, FIG. 3E, FIG. 3F, FIG. 3G, and FIG. 3H illustrate an example of processing a past episode of locomotion of a vehicle for training the machine learning layer(s) of the machine learning model(s) of FIG. 2A, in accordance with various implementations.

DETAILED DESCRIPTION

Figure 1:
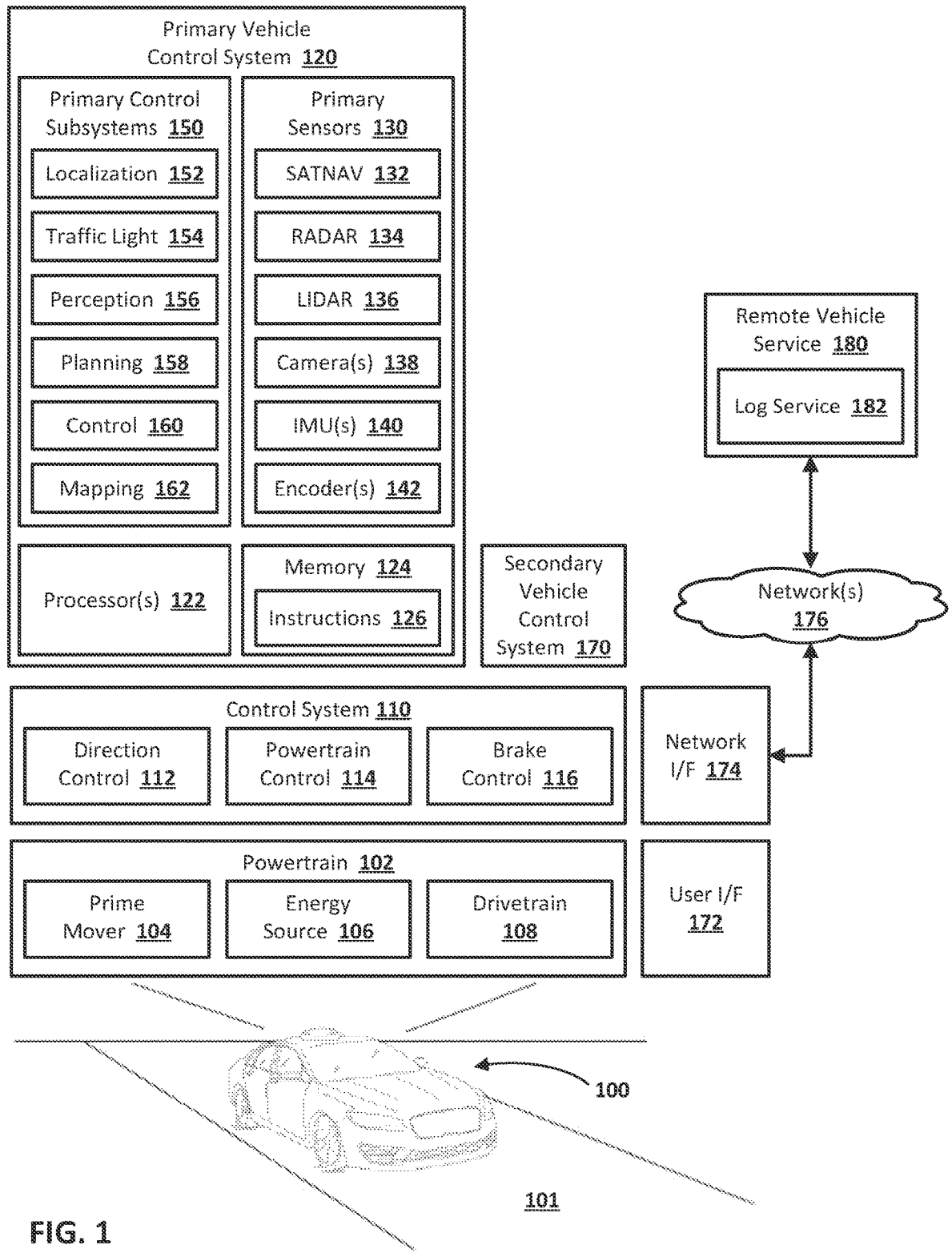
FIG. 1 illustrates an example hardware and software environment for an autonomous vehicle, in accordance with various implementations.

Various implementations described herein relate to a system for training machine learning (ML) layer(s) of ML model(s), and subsequently utilizing the trained ML layer(s) in controlling an autonomous vehicle (AV). The ML layer(s)

can be trained based on past episodes of locomotion of a vehicle. The past episode of locomotion may be captured in driving data generated by sensor(s) of the vehicle during driving of the vehicle or by other sensor(s) in the environment during the driving of the vehicle. In some implementations, the driving data that captures the past episode can include manual driving data that is captured while a human is driving the vehicle (e.g., an autonomous vehicle (AV) or a non-AV retrofitted with sensor(s)) in a real environment and in a conventional mode, where the conventional mode represents the vehicle under active physical control of a human operating the vehicle. In other implementations, the driving data that captures the past episode can be autonomous driving data that is captured while the vehicle (e.g., an AV) is driving in a real environment and in an autonomous mode, where the autonomous mode represents the AV being autonomously controlled. In yet other implementations, the driving data that captures the past episode can be simulated driving data captured while a virtual human is driving the vehicle (e.g., a virtual vehicle) in a simulated world.

In some implementations, a plurality of actors can be identified, from the driving data, at a given time instance of the past episode of locomotion. The plurality of actors may each be associated with a plurality of features. The plurality of features can include, for example, at least one of: velocity information for each of the plurality of actors; or distance information for each of the plurality of actors. Further, a plurality of streams can be identified in the environment of the vehicle. The plurality of streams may each correspond to a sequence of poses that represent a candidate navigation path in the environment of the vehicle. For example, a first stream can be a first candidate navigation path for a first actor, a second stream can be a second candidate navigation path for the first actor, a third stream can be a candidate navigation path for the vehicle (e.g., the currently planned navigation paths), etc.

During training, the system can iteratively forecast trajectories for the vehicle and for each of the plurality of actors in an environment of the vehicle. For instance, the system can process the plurality of actors (or features thereof) and the plurality of streams, using the ML layer(s), to generate trajectories for the vehicle and for each of the plurality of additional actors. The trajectory for the vehicle can be a predicted trajectory that is generated with respect to a stream being navigated by the vehicle at the given instance of the past episode of locomotion. Further, the trajectories for each of the plurality of actors can be predicted trajectories that are generated with respect to a corresponding stream being navigated by a corresponding one of the plurality of actors at the given instance of the past episode of locomotion. In some implementations, the ML layer(s) can include attention layer(s) that attentions each of the trajectories to the streams being navigated by the vehicle or each of the plurality of actors. For example, assume the vehicle is navigating along a first stream, an additional vehicle is navigating along a second stream, and a pedestrian is navigating along a third stream. In this example, the system can generate the trajectory for the vehicle with respect to the first stream, the trajectory for the additional vehicle with respect to the second stream, and the trajectory for the pedestrian with respect to the third stream.

Further, the system can process the trajectories that are initially forecast as described above, using a stream connection function, to generate additional trajectories for the vehicle and for each of the plurality of additional actors and with respect to each of the other streams. Continuing with the above example, the trajectory for the vehicle can be processed using the stream connection function to generate an additional trajectory for the vehicle with respect to the second stream being navigated by the additional vehicle and another additional trajectory for the vehicle with respect to the third stream being navigated by the pedestrian. Further, the trajectory for the additional vehicle can be processed using the stream connection function to generate an additional trajectory for the additional vehicle with respect to the first stream being navigated by the vehicle and another additional trajectory for the additional vehicle with respect to the third stream being navigated by the pedestrian. Moreover, the trajectory for the pedestrian can be processed using the stream connection function to generate an additional trajectory for the pedestrian with respect to the first stream being navigated by the vehicle and another additional trajectory for the pedestrian with respect to the second stream being navigated by the additional vehicle.

In some implementations, the stream connection function can leverage a previously stored mapping of the environment of the vehicle to shift a frame of reference of trajectories (e.g., a frame of reference that the vehicle or the actor is navigating) to multiple other frames of reference (e.g., the frame of reference of other actors in the environment or the frames of reference of the other actors in the environment for the vehicle). In some implementations, the stream connection function can correspond to one or more differentiable ML layers of the ML model(s) or any other type of ML layer(s) (that are optionally parameterized) that can utilize differential mapping techniques to shift the frame of reference of the initially forecast trajectories to the multiple other frames of reference. In additional or alternative implementations, the stream connection function can be external to the ML model(s), but utilized in conjunction with the ML model(s). In some implementations, when the ML layer(s) of the ML model(s) are updated as described herein, the one or more of the ML layers of the ML model(s) that correspond to the stream connection function can be fixed such that the stream connection function is not updated. In additional or alternative implementations, when the ML layer(s) of the ML model(s) are updated as described herein, the one or more of the ML layers of the ML model(s) that correspond to the stream connection function can also be updated (e.g., the parameters or weights of the stream connection function can be updated) such that the stream connection function can be smoothed with respect to shifting the frame of reference of the trajectories to the multiple other frames of reference.

Moreover, the system can compute new features for the vehicle and the additional actors in the environment since the vehicle and the additional actors are represented in the frames of reference of one another. These new features can include, for example, and with respect to one or more of the frames of reference, distance information between each of the actors, relative velocity information between each of the actors, or any other features that can be computed based on comparing the trajectories across the multiple frames of reference. In some implementations, in computing these new features, the system can align the multiple frames of reference and compare the trajectories in a pairwise manner to compute the new features for the vehicle and for each of the plurality of actors across one or more of the multiple frames of reference. The system can update the trajectories for the vehicle and for each of the plurality of actors based on these new features. For instance, the system can process the plurality of actors (or the new features thereof) and the plurality of streams, using the ML layer(s), to generate updated trajectories for the vehicle and for each of the plurality of additional actors with respect to the stream being currently navigated by the vehicle or each of the additional actors.

Put another way, the system can initially forecast the trajectories for the vehicle and each of the additional actors with respect to an associated stream being navigated by the vehicle or one or the additional actors. Further, the system can transform the trajectories into the multiple frames of reference using the stream connection function. By transforming the trajectories into the multiple frames of reference, the system can compute new features for the vehicle and for each of the additional actors based on how the vehicle is related to the additional vehicle in the environment, based on how the vehicle is related to the pedestrian in the environment, and how the additional vehicle is related to the pedestrian the in the environment across the multiple frames of reference. Moreover, the system can update the trajectories for the vehicle and for each of the actors with respect to the streams that they are currently navigating based on these new features computed from these transformations. The system can repeat this process for k iterations, where k is a positive integer, to further update the trajectories for the vehicle and for each of the additional actors in the environment of the vehicle. In some implementations, k is a static integer, whereas in other iterations k is a dynamic integer that is determined based on one or more of a quantity of the plurality of actors in the environment, a quantity of the plurality of streams in the environment, or other criteria. As a result, the system can update the trajectories for the vehicle and for each of the additional actors based on additional information learned at each of the k iterations.

Continuing with the above example, assume the first stream (e.g., that the vehicle is navigating) merges with the second stream (e.g., that the additional vehicle is navigating), and assume that the second stream crosses the third stream (e.g., that the pedestrian is navigating). In computing the new features for the vehicle and for each of the additional actors, the system can determine, for example, one or more of a closest predicted distance or an average distance between the vehicle navigating along the first stream and the additional vehicle navigating along the second stream that merges with the first stream based on the trajectories of the vehicle and the additional vehicle in the multiple frames of reference. The closest predicted distance or the average distance can be determined based on a pairwise comparison of the additional trajectory of the vehicle with respect to the second stream (e.g., generated using the stream connection function) and the trajectory of additional vehicle with respect to the second stream (e.g., generated based on the initial forecasting). Additionally, or alternatively, the closest predicted distance or the average distance can be determined based on a pairwise comparison of the trajectory of the vehicle with respect to the first stream (e.g., generated based on the initial forecasting) and the additional trajectory of the additional vehicle with respect to first stream (e.g., generated using the stream connection function). Similarly, the system can determine, for example, a relative velocity of the vehicle navigating along the first stream and a relative velocity of the additional vehicle navigating along the second stream that merges with the first stream based on the trajectories of the vehicle and the additional vehicle in the multiple frames of reference in the same or similar manner.

As a result, based on these new features, the system can determine that the vehicle may need to yield to the additional vehicle and cause the trajectory for the vehicle to be updated to reflect the vehicle yielding to the additional vehicle. This process can be repeated between each of the actors and each of the multiple frames of reference to update each the trajectories at this iteration. However, at this iteration, the system may not be able to predict how the updated trajectories for the vehicle and each of the additional actors will influence how the actors should navigate through the environment. Accordingly, the system can perform an additional iteration of this process to further update the trajectories based on additional new features that are computed at the additional iteration.

In sum, the system can initially forecast trajectories for the vehicle and for each of the additional actors in the environment independent of one another using the ML layer(s). However, it is highly likely that the actors will interact with each other in the environment (e.g., yield for one another, merge into the same streams, etc.). Accordingly, by using the stream connection function, the trajectories that are initially forecast for the vehicle and for each of the additional actors can be projected onto each the other actors in the environment, and new features can be computed based on how the actors are predicted to interact with another by projecting the trajectories into the frames of reference of each of the other actors. Based on these new features determined using the stream connection function, the trajectories for the vehicle and each of the additional actors can be updated based on how they are predicted to interact with one another. However, these updated trajectories may not reflect how the updated trajectories will influence how each of the actors interact with one another determined based on a most recent iteration. Accordingly, the system can perform additional iterations to further update the trajectories for the vehicle and for each of the additional actors.

Further, predicted output(s) can be determined based on the trajectories for the vehicle and for each of the additional actors. In some implementations, the predicted output(s) include the trajectories for the vehicle and for each of the additional actors. In additional or alternative implementations, the predicted output(s) include constraint(s) that that increase a cost of future motion of the vehicle or restrict future motion of the vehicle in the environment that are determined based on the trajectories for the vehicle and for each of the additional actors. In these implementations, the constraint(s) can include one or more of locational constraint(s) that restrict where the vehicle can be located in the environment based on the trajectories or temporal constraint(s) that restrict when the vehicle can move in the environment based on the trajectories. In additional or alternative implementations, the predicted output(s) include a distribution of actions to be performed by the vehicle that is determined based on the trajectories for the vehicle and for each of the additional actors. In these implementations, the distribution of actions can be generated based on processing these trajectories using additional ML layer(s) of the ML model(s). In additional or alternative implementations, the predicted output(s) include cost(s) associated with action(s) to be performed by the vehicle that is determined based on the trajectories for the vehicle and for each of the additional actors. In these implementations, the cost(s) associated with action(s) to be performed by the vehicle can be generated based on processing the trajectories using additional ML layer(s) of the ML model(s). In training the ML layer(s), the predicted output(s) can be compared to associated reference label(s) for the episode of locomotion to generate loss(es), and the ML layer(s) can be updated based on the loss(es) as described herein.

Subsequent to training the ML layer(s), the ML layer(s) can be utilized in controlling the AV during a current episode of locomotion. For example, a sensor data instance of sensor data generated by one or more sensors of the AV can be received. The sensor data can be processed to identify a plurality of actors in an environment of the AV, and a plurality of streams can be identified based on the environment of the AV, or the identified actors in the environment. Further, trajectories for the AV and for each of the plurality of actors can be generated using the iterative forecasting described above to generate predicted output(s). The predicted output(s) can be processed, using the additional ML layer(s), to generate further predicted output(s), and the AV can be controlled based on the further predicted output(s). In some implementations, the further predicted output(s) can include AV control strategies or AV control commands. The AV control strategies or AV control commands can be ranked in a list, or pruned from the list as described herein. In other implementations, the further predicted output(s) can directly indicate the AV control strategies or AV control commands that are to be utilized in controlling the AV.

Prior to further discussion of these and other implementations, however, an example hardware and software environment that the various techniques disclosed herein may be implemented will be discussed.

Turning to the drawings, wherein like numbers denote like parts throughout the several views, FIG. 1 illustrates an example autonomous vehicle 100 (also referred to simply as vehicle 100) that the various techniques disclosed herein may be implemented. Vehicle 100, for example, is shown driving on a road 101, and vehicle 100 may include powertrain 102 including prime mover 104 powered by energy source 106 and capable of providing power to drivetrain 108, as well as control system 110 including direction control 112, powertrain control 114, and brake control 116. Vehicle 100 may be implemented as any number of different types of vehicles, including vehicles capable of transporting people or cargo, and it will be appreciated that the aforementioned components 102-116 can vary widely based upon the type of vehicle that these components are utilized.

The implementations discussed hereinafter, for example, will focus on a wheeled land vehicle such as a car, van, truck, bus, etc. In such implementations, prime mover 104 may include one or more electric motors or an internal combustion engine (among others), while energy source 106 may include a fuel system (e.g., providing gasoline, diesel, hydrogen, etc.), a battery system, solar panels or other renewable energy source, a fuel cell system, etc., and the drivetrain 108 may include wheels or tires along with a transmission or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In various implementations, different combinations of prime movers 104 and energy sources 106 may be used. In the case of electric/gas hybrid vehicle implementations, one or more electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

Direction control 112 may include one or more actuators or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations, various components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (including degrees of autonomy as well as selectively autonomous functionality) may be implemented in a primary vehicle control system 120 that may include one or more processors 122 and memory 124, with the one or more processors 122 configured to execute program code instructions 126 stored in memory 124.

Primary sensor system 130 may include various sensors suitable for collecting information from a vehicle's surrounding environment for use in controlling the operation of the vehicle. For example, satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection and Ranging (RADAR) sensor 134 and Light Detection and Ranging (LIDAR) sensor 136, as well as one or more cameras 138 (including various types of vision components capable of capturing still or video imagery), may be used to sense stationary and moving objects within the immediate vicinity of a vehicle. Inertial measurement unit (IMU) 140 may include multiple gyroscopes and accelerometers capable of detection linear and rotational motion of a vehicle in three directions, while wheel encoder(s) 142 may be used to monitor the rotation of one or more wheels of vehicle 100.

The outputs of sensors 132-142 may be provided to a set of primary control subsystems 150, including, localization subsystem 152, traffic light subsystem 154, perception subsystem 156, planning subsystem 158, control subsystem 160, and a mapping subsystem 162. Localization subsystem 152 may determine the location and orientation (also sometimes referred to as pose that may also include one or more velocities or accelerations) of vehicle 100 within its surrounding environment, and generally with respect to a particular frame of reference. Traffic light subsystem 154 may identify intersections and traffic light(s) associated therewith, and process a stream of vision data corresponding to images of the traffic light(s) to determine a current state of each of the traffic light(s) of the intersection for use by planning, control, and mapping subsystems 158-162, while perception subsystem 156 may detect, track, or identify elements within the environment surrounding vehicle 100.

In some implementations, traffic light subsystem 154 may be a subsystem of perception subsystem 156, while in other implementation, traffic light subsystem is a standalone subsystem. Control subsystem 160 may generate suitable control signals for controlling the various controls in control system 110 in order to implement the planned path of the vehicle. In addition, mapping subsystem 162 may be provided in the illustrated implementations to describe the elements within an environment and the relationships therebetween. Further, mapping subsystem 162 may be accessed by the localization, traffic light, planning, and perception subsystems 152-158 to obtain information about the environment for use in performing their respective functions. Moreover, mapping subsystem 162 may interact with remote vehicle service 180, over network(s) 176 via a network interface (network I/F) 174 to obtain driving data from episodes of locomotion of vehicle 100 as described below.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy or to cover different regions around a vehicle, and other types of sensors may be used. Likewise, different types or combinations of control subsystems may be used in other implementations. Further, while subsystems 152-162 are illustrated as being separate from processors 122 and memory 124, it will be appreciated that in some implementations, portions or all of the functionality of subsystems 152-162 may be implemented with program code instructions 126 resident in memory 124 and executed by the one or more of processors 122. Further, these subsystems 152-162 may in some instances be implemented using the same processors or memory, while in other instances may be implemented using different processors or memory. Subsystems 152-162 in some implementations may be implemented at least in part using various dedicated circuit logic, various processors, field-programmable gate arrays (FPGA), application-specific integrated circuits (ASIC), real time controllers, and the like, and as noted above, multiple subsystems may utilize common circuitry, processors, sensors, or other components. Further, the various components in primary vehicle control system 120 may be networked in various manners.

In some implementations, vehicle 100 may also include a secondary vehicle control system 170 that may be used as a redundant or backup control system for vehicle 100. In some implementations, secondary vehicle control system 170 may be capable of fully operating vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. The one or more processors 122 may be implemented, for example, as central processing unit(s) (CPU(s)), graphics processing unit(s) (GPU(s)), tensor processing unit(s) (TPU(s)), or any combination thereof, and portions of memory 124 may represent random access memory (RAM) devices comprising a main storage, as well as any supplemental levels of memory, e.g., cache memories, non-volatile or backup memories (e.g., programmable or flash memories), read-only memories, etc. In addition, the portions of memory 124 may be considered to include memory storage physically located elsewhere in vehicle 100, e.g., any cache memory in a processor, as well as any storage capacity used as a virtual memory, e.g., as stored on a mass storage device or on another computer or controller. The one or more processors 122 illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, or a tape drive, among others. Furthermore, vehicle 100 may include a user interface 172 to enable vehicle 100 to receive a number of inputs from and generate outputs for a user or human operator, e.g., via one or more displays, touch-screens, voice or gesture interfaces, buttons and other tactile controls, etc. Otherwise, user input may be received via another computer or electronic device, e.g., via an app on a mobile device or via a web interface, e.g., from a human operator.

Moreover, vehicle 100 may include one or more network interfaces, e.g., network interface 174, suitable for communicating with network(s) 176 (e.g., a LAN, a WAN, a wireless network, Bluetooth, or the Internet, among others) to permit the communication of information with other vehicles, computers, or electronic devices, including, for example, a central service, such as a cloud service that vehicle 100 may receive environmental and other data for use in autonomous control thereof. In the illustrated implementations, for example, vehicle 100 may be in communication with a cloud-based remote vehicle service 180 including, at least for the purposes of implementing various functions described herein, a log service 182. Log service 182 may be used, for example, to collect or analyze driving data from past episodes of locomotion, from vehicle 100 during current episodes of locomotion (i.e., during manual operation or autonomous operation), from one or more other non-autonomous vehicles retrofitted with one or more of the sensors described herein (e.g., one or more of primary sensors 130), or from simulated driving of a simulated instance of vehicle 100. Using the log service 182 enables updates to be made to the global repository, as well as for other offline purposes such as training machine learning model(s) for use by vehicle 100 (e.g., as described in detail herein with respect to FIGS. 2A and 2B).

The one or more processors 122 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail herein. Moreover, various applications, programs, objects, modules, or other components may also execute on one or more processors in another computer coupled to vehicle 100 via network(s) 176, e.g., in a distributed, cloud-based, or client-server computing environment, whereby the processing required to implement the functions of a computer program may be allocated to multiple computers or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as program code. Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program codes described hereinafter may be identified based upon the application that it is implemented within in a specific implementation. However, it should be appreciated that any particular program nomenclature that follows is used merely for convenience, and thus the invention should not be limited to use solely in any specific application identified or implied by such nomenclature. Furthermore, based on the typically endless number of manners that computer programs may be organized into routines, procedures, methods, modules, objects, and the like, as well as the various manners that program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware or software environments may be used without departing from the scope of the invention.

Figure 2A:
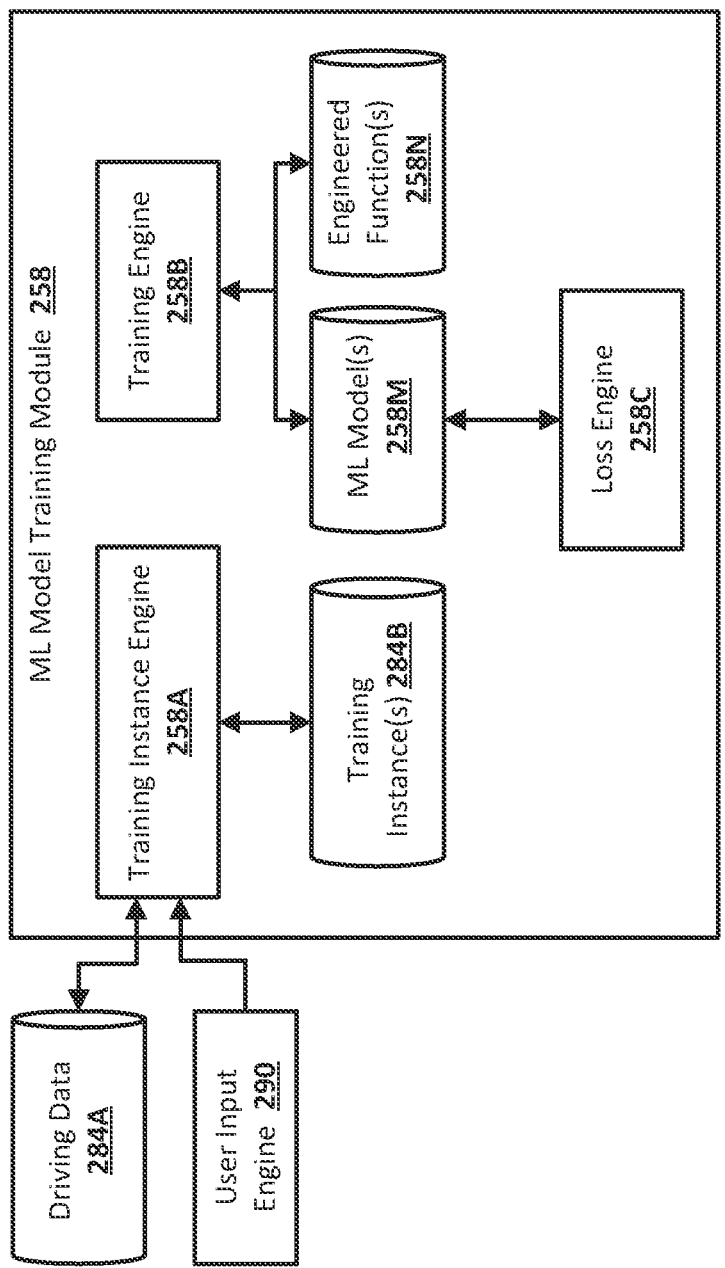
FIG. 2A is a block diagram illustrating an example training architecture for training machine learning layer(s) of machine learning model(s) for use in controlling an autonomous vehicle, in accordance with various implementations.

FIG. 2A is a block diagram illustrating an example training architecture for training one or more machine learning (ML) layers of one or more ML models for use in controlling an autonomous vehicle (AV). As shown in FIG. 2A, an ML model training module 258 can include training instance engine 258A, training engine 258B, and loss engine 258C. The ML model training module 258 can be implemented by a computing system, or by multiple computing systems in communication over one or more networks (e.g., LAN, WAN, Internet, Wi-Fi, Bluetooth, etc.) in a distributed manner. For example, one or more aspects of the ML model training module 258 can be implemented by a server that has access to one or more of the ML models (e.g., to train one or more of the ML layers), and other aspects of the ML model training module 258 can be implemented by an additional server (e.g., to generate training instances for training one or more of the ML layers). Although a particular architecture is depicted in FIG. 2A, it should be understood that is for the sake of example and is not meant to be limiting.

The training instance engine 258A can obtain driving data from driving data database 284A (e.g., collected via the log service 182 of FIG. 1). The driving data can include data describing one or more actors captured during a given past episode of locomotion of a vehicle. In some implementations, each of the one or more actors can be associated with a plurality of features. The features can include, for example, one or more of velocity information for each of the actors, distance information for each of the actors, or pose information for each of the actors. Further, the driving data can include a plurality of streams in the environment of the vehicle from the given past episode. Each of the plurality of streams can represent a sequence of poses corresponding to candidate navigation paths, for the vehicle or for one or more of the actors in the environment from the given past episode. In some implementations, the driving data database 284A can include driving data for a plurality of disparate past episodes of locomotion of the vehicle (and optionally from past episodes of locomotion of other vehicles). In some implementations, the driving data can be manual driving data that is captured while a human is driving the vehicle (e.g., an AV or non-AV retrofitted with sensors (e.g., primary sensors 130 of FIG. 1)) in a real environment and in a conventional mode, where the conventional mode represents the vehicle under active physical control of a human operating the vehicle. In other implementations, the driving data can be autonomous driving data that is captured while the vehicle (e.g., an AV) is driving in a real environment and in an autonomous mode, where the autonomous mode represents the vehicle being autonomously controlled. In yet other implementations, the driving data can be simulated driving data captured while a virtual human is driving the vehicle (e.g. a virtual vehicle) in a simulated world. The actors and the streams for an example episode of locomotion are described in greater detail below (e.g., with respect to FIGS. 3A-3H).

Moreover, the training instance engine 258A can generate a plurality of training instances based on the driving data stored in the driving data database 284A for training one or more ML layers of one or more ML models in the ML model(s) database 258M. The plurality of training instances can each include training instance input and training instance output. The training instance engine 258A can generate the training instance input, for each of the plurality of training instances, by obtaining driving data for a given past episode of locomotion of the vehicle, and identifying: (i) one or more actors (and optionally corresponding features associated therewith) from a given time instance of the given past episode; and (ii) a plurality of streams in an environment of the vehicle during the given past episode. The training instance output can include one or more reference labels for the given simulated episode of locomotion of the vehicle. The one or more reference labels can include, for example, an indication of one or more of ground truth constraints on future motion of the vehicle for the given past episode, ground truth associated trajectories for the actors in the environment of the vehicle, ground truth distributions of actions for the vehicle in the environment, ground truth costs associated with the vehicle performing one or more actions, or other ground truth measures determined based on the past episode. The training instance engine 258A can store each of the plurality of training instances in training instance(s) database 284B.

In some implementations, the training instance engine 258A can generate the one or more reference labels for ground truth trajectories of the one or more actors. For example, the training instance engine 258A can extract, for a plurality of time instances of a past episode between a given time instance and a subsequent time instance, a plurality of features associated with each of the one or more actors, determine, based on the plurality of features associated with each of the one or more actors, and for each of the plurality of time instances, a lateral distance between each of the one or more actors and each of the plurality of streams, and generate, based on the lateral distance between each of the one or more actors and each of the plurality of streams for each of the plurality of time instances, one or more of the reference labels. For instance, the training instance engine 258A can extract a plurality of features associated with each of the one or more actors every N seconds of the past episode of locomotion (e.g., where N is any positive, real number), determine the distances for each of the one or more actors, and generate the ground truth associated trajectories for the additional actors based on the determined distances. In some additional or alternative implementations, one or more of the reference labels can be defined for a given training instance based on user input from a human operator detected via user input engine 290. The user input can be received subsequent to the past episode of locomotion via one or more user interface input devices (e.g., keyboard and mouse, touchscreen, joystick, and so on). In some other versions of those implementations, the user input detected via the user input engine 290 can alter or modify one or more reference labels that were automatically generated using the training instance engine 258A.

The training engine 258B can be utilized to train one or more of the ML layers of one or more of the ML models stored in the ML model(s) database 258M based on the plurality of training instances stored in the training instance(s) database 284B. One or more of the layers of one or more the ML models stored in the ML model(s) database 258M can correspond to, for example, ML layers of a recurrent neural network (RNN) ML model, a transformer ML model, a graph neural network (GNN) ML model, or other ML model(s). For example, one or more of the ML layers can include, for example, one or more of a plurality of encoding layers, a plurality of decoding layers, a plurality of feed forward layers, a plurality of attention layers, or additional layers. The ML layers can be arranged in different manners, resulting in various disparate portions of the ML model(s). For example, the encoding layers, the feed forward layers, and the attention layers can be arranged in a first manner to generate multiple encoder portions of the ML model(s). Further, the decoding layers, the feed forward layers, and the attention layers can be arranged in a second manner to generate multiple decoder portions of the ML model(s). The multiple encoder portions may be substantially similar in structure, but may not share the same weights. Similarly, the multiple decoder portions may also be substantially similar in structure, but may not share the same weights either. In some implementations, the one or more actors (or features thereof) and the plurality of streams of a given training instance can be represented as a tensor of values when processed using the ML model, such as a vector or matrix of real numbers corresponding to the features of the actors and the streams. The tensor of values can be processed using the ML layers of the ML model(s) to generate one or more predicted outputs.

As described below (e.g., with respect to FIG. 2B), the one or more actors and the plurality of streams, for a given training instance, can be processed in parallel using one or more of the ML layers to forecast associated trajectories for the vehicle and each of the one or more actors included in the given training instance. Further, the associated trajectories can be updated in an iterative manner using one or more of the ML layers and a stream connection function stored in engineered function(s) database 258N. The stream connection function can correspond to, for example, a hand-engineered or learned function that leverages a previously stored mapping of the environment of the vehicle to shift a frame of reference of associated trajectories (e.g., a frame of reference that the actor is navigating) to multiple other frames of reference (e.g., the frames of reference of other actors in the environment). Put another way, the stream connection function can be used to model the geometry of the environment to determine that X location with respect to a first frame of reference corresponds to Y location in another frame of reference. In some implementations, the associated trajectories for the vehicle and for each of the one or more actors at a final iteration of the processing can be utilized as the one or more predicted outputs. In additional or alternative implementations, the associated trajectories for the vehicle and for each of the one or more actors at the final iteration can be further processed to determine one or more of predicted vehicle constraints, a predicted distribution of actions for the vehicle, or predicted costs associated with one or more actions for the vehicle, and one or more of these can be utilized as the one or more predicted outputs.

Although the engineered function(s) database 258N is depicted as separate from the ML model(s) database 258M, it should be understood that is for the sake of clarity and is not meant to be limiting. For example, in some implementations, the stream connection function can correspond to one or more differentiable ML layers of the ML model(s) or any other type of ML layer(s) (that are optionally parameterized) of one or more of the ML model(s) stored in the ML model(s) database 258M. In additional or alternative implementations, the stream connection function can be external to the ML model(s), but utilized in conjunction with the ML model(s). In some implementations, when the ML layer(s) of the ML model(s) are updated as described herein, the one or more of the ML layers of the ML model(s) that correspond to the stream connection function can be fixed such that the stream connection function is not updated. In additional or alternative implementations, when the ML layer(s) of the ML model(s) are updated as described herein, the one or more of the ML layers of the ML model(s) that correspond to the stream connection function can also be updated (e.g., the parameters or weights of the stream connection function can be updated) such that the stream connection function can be smoothed with respect to shifting the frame of reference of the trajectories to the multiple other frames of reference.

The loss engine 258C can be utilized to generate one or more losses based on the processing of a given training instance, and to update one or more of the ML layers of one or more of the ML models based on one or more of the losses. For example, the loss engine 258C can generate one or more losses based on comparing the one or more predicted output for a given training instance to the one or more reference labels for the given training instance. For instance, the loss engine 258C can backpropagate one or more of the losses across one or more of the ML layers to update one or more weights of one or more of the ML layers of the ML models. In some implementations, only a subset of the one or more ML layers may be updated based on one or more of the losses, while other layers of the one or more ML layers may be fixed. In other implementations, the one or more ML layers may be updated based on one or more of the losses.

Figure 2B:
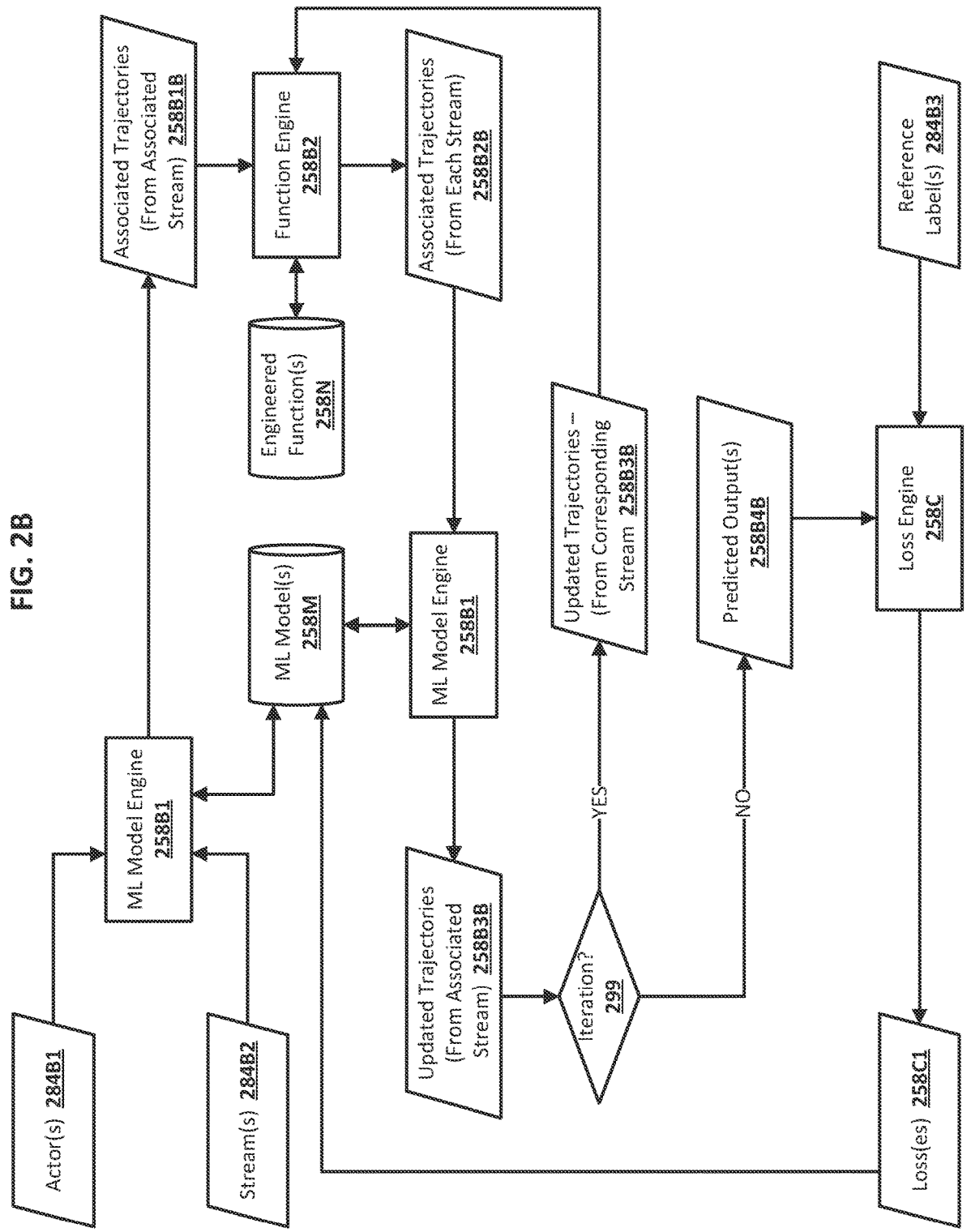
FIG. 2B is an example process flow for training machine learning layer(s) of the machine learning model(s) of FIG. 2A, in accordance with various implementations.

FIG. 2B is an example process flow for training one or more of the ML layers of one or more of the ML models of FIG. 2A. Notably, FIG. 2B describes a process flow for processing a given training instance using the ML model training module 258 of FIG. 2B. For example, assume training instance input, of the given training instance, include a plurality of actors 284B1 and a plurality of streams 284B2. ML model engine 258B1 can process the plurality of actors 284B1 and the plurality of streams 284B1, using one or more of the ML layers of one or more of the ML models stored in ML model(s) database 258M, to generate associated trajectories 258B1B for the vehicle and for each of the plurality of actors 284B1 with respect to an associated stream for the corresponding actors. In processing the plurality of actors 284B1 and the plurality of streams 284B2, one or more attention layers, of one or more of the ML layers, can attention each of the associated trajectories to the associated stream for the corresponding actors (e.g., hence the (From Associated Stream)). Put another way, the associated trajectories 258B1B for the vehicle and each of the additional actors can be forecast independent and with respect to a stream that is being navigated for that actor (e.g., as described with respect to FIGS. 3A-3H).

Function engine 258B2 can process, using the stream connection function stored in the engineered function(s) database 258N, the associated trajectories 258B1B to generate, for the vehicle and for each of plurality of actors 284B1, a plurality of associated trajectories 258B2B. In processing the associated trajectories 258B1B, the stream connection function can generate additional trajectories for the vehicle and for each of the plurality of actors 284B1 with respect to the associated streams that are associated with each of the other actors in the environment (e.g., hence the (From Each Stream)). Put another way, the associated trajectories 258B2B for the vehicle and each of the additional actors can be the same trajectories, but from different frames of reference in the environment (e.g., as described with respect to FIGS. 3A-3H). Although the function engine 258B2 that utilizes the stream connection function stored in the engineered function(s) database 258N is depicted as being separate from the ML model engine 258B1 that utilizes the ML model(s) stored in the ML model(s) database 258M, it should be understood that is for the sake of clarity and is not meant to be limiting. For example, in some implementations, the stream connection function can correspond to one or more differentiable ML layers of the ML model(s) or any other type of ML layer(s) (that are optionally parameterized) of one or more of the ML model(s) stored in the ML model(s) database 258M. In these examples, the stream connection function is part of one or more of the ML model(s) stored in the ML model(s) database 258M. In additional or alternative implementations, the stream connection function can be external to the ML model(s), but utilized in conjunction with the ML model(s) (e.g., as depicted in FIG. 2B).

ML model engine 258B1 can process, using one or more of the ML layers, the associated trajectories 258B2B to generate updated trajectories 282B3B for the vehicle and for each the plurality of actors 284B1 with respect to the associated stream for the corresponding actors. In processing the associated trajectories 258B2B, one or more of the attention layers, of one or more of the ML layers, can attention each of the associated trajectories to the associated stream for the corresponding actors (e.g., hence the (From Associated Stream)). For example, one or more of the attention layers can be utilized to compare each of the associated trajectories 258B2B in a pairwise manner to determine new features of the vehicle and one or more of the actors for a given associated trajectory that is relevant to the other associated trajectories, and can generate the updates trajectories 258B3B for the vehicle and for each of the plurality of actors 284B1 based on these new features. These new features can include, for example, and with respect to one or more of the frames of reference, distance information between each of the actors, relative velocity information between each of the actors, or any other features that can be computed based on comparing the trajectories across the different frames of reference.

Put another way, each of the associated trajectories 258B1B can be initially forecast with respect to an associated stream that the associated actor is navigating using one or more of the ML layers. For example, assume the vehicle is navigating along a first stream, of the plurality of streams 284B2, and an additional vehicle corresponding to a first actor, of the plurality of actors 284B1, is navigating along a second stream, of the plurality of streams 284B2. In this example, an associated trajectory, of the associated trajectories 258B1B, for the vehicle can be forecast with respect to the first stream, and an associated trajectory, of the associated trajectories 258B1B, for the additional vehicle can be independently forecast with respect to the second stream using one or more of the ML layers. Further, the associated trajectory for the vehicle can be processed, using the stream connection function, to generate an associated trajectory, of the associated trajectories 258B2B, for the vehicle with respect to the second stream, and the associated trajectory for the additional vehicle can be processed, using the stream connection function, to generate an associated trajectory, of the associated trajectories 258B2B, for the additional vehicle with respect to the first stream. Notably, the associated trajectories 258B2B in this example include four associated trajectories—1) vehicle-first stream; 2) vehicle-second stream; 3) additional vehicle-second stream; and 4) additional vehicle-first stream. By comparing the associated trajectories 258B2B in a pairwise manner, the new features of one actor that are relevant to another actor can be determined, and each of the associated trajectories 258B1B can be updated based on the new features, resulting in the updated trajectories 258B3B-1) updated vehicle-first stream; and 2) updated additional vehicle-second stream.

However, based on a complexity of the environment (e.g., a quantity of the plurality of actors 284B1 and a quantity of the plurality of streams 284B2), a single iteration of forecasting in this manner may not be sufficient to effectively forecast the trajectories. Accordingly, operations at block 299 determine whether to perform an additional iteration of this iterative processing. Assuming that it is determined to perform an additional iteration at block 299, the function engine 258B2 can process, using the stream connection function, the updated trajectories 258B3B to generate additional associated trajectories with respect to each of the streams, and the ML model engine 258B1 can process, using one or more of the ML layers, the additional associated trajectories to further update the associated trajectories. This process can be repeated for k iterations, where k is a positive integer. In some implementations, k can be a fixed integer, whereas in other implementations, k can be dynamic. In these other implementations, k can be based on one or more of a quantity of the plurality of actors 284B1 in the environment, a quantity of candidate navigation paths represented by the plurality of streams 284B1, or until forecasted trajectories stop changing. Multiple iterations are described in more detail herein (e.g., with respect to FIGS. 3A-3H).

Further, assuming that it is determined not to perform an additional iteration at block 299, one or more predicted outputs 258B4B can be determined. In some implementations, the one or more predicted outputs 258B4B can include the associated trajectories for the vehicle and for each of the plurality of actors 284B1. In these implementations, the loss engine 258C can generate one or more losses 258C1 based on comparing the associated trajectories to ground truth trajectories indicated by one or more associated reference labels 284B3 of training instance output for the given training instance. In additional or alternative implementations, the one or more predicted outputs 258B4B can include one or more constraints (e.g., locational constraints, temporal constraints, or both) that increase a cost of motion of the autonomous vehicle or that restrict future motion of the vehicle. The one or more constraints can be determined based on, for example, the associated trajectories for one or more of the plurality of actors 284B1 (e.g., described with respect to FIGS. 3F-3H). In these implementations, the loss engine 258C can generate one or more of the losses 258C1 based on comparing the one or more constraints to one or more ground truth constraints indicated by one or more associated reference labels 284B3 of the training instance output for the given training instance. In additional or alternative implementations, the one or more predicted outputs 258B4B can include a distribution of actions for the vehicle. The distribution of actions can be determined based on, for example, processing the associated trajectories for the vehicle and for each of the plurality of actors 284B1 using one or more additional ML layers of one or more of the ML models. In these implementations, the loss engine 258C can generate one or more of the losses 258C1 based on comparing the distribution of actions to a ground truth distribution of actions indicated by one or more associated reference labels 284B3 of the training instance output for the given training instance. In additional or alternative implementations, the one or more predicted outputs 258B4B can include one or more costs associated with a distribution of actions for the vehicle. The one or more costs associated with the distribution of actions can be determined based on, for example, processing the associated trajectories for the vehicle and for each the plurality of actors 284B1 using one or more additional ML layers of one or more of the ML models. In these implementations, the loss engine 258C can generate one or more of the losses 258C1 based on comparing the one or more costs associated with the distribution of actions to one or more ground truth costs associated with a ground truth distribution of actions indicated by one or more associated reference labels 284B3 of the training instance output for the given training instance.

Although multiple instances of the ML model engine 258B1 are depicted in FIG. 2B, it should be understood that is for the sake of clarity and is not meant to be limiting. Moreover, although the function engine 258B2 is depicted separate from the ML model engine 258B1, it should be understood that is for the sake of clarity and is not meant to be limiting. For instance, it should be understood that the training engine 258B of FIG. 2A can be utilized to implement the process flow of FIG. 2B.

Figure 3A:
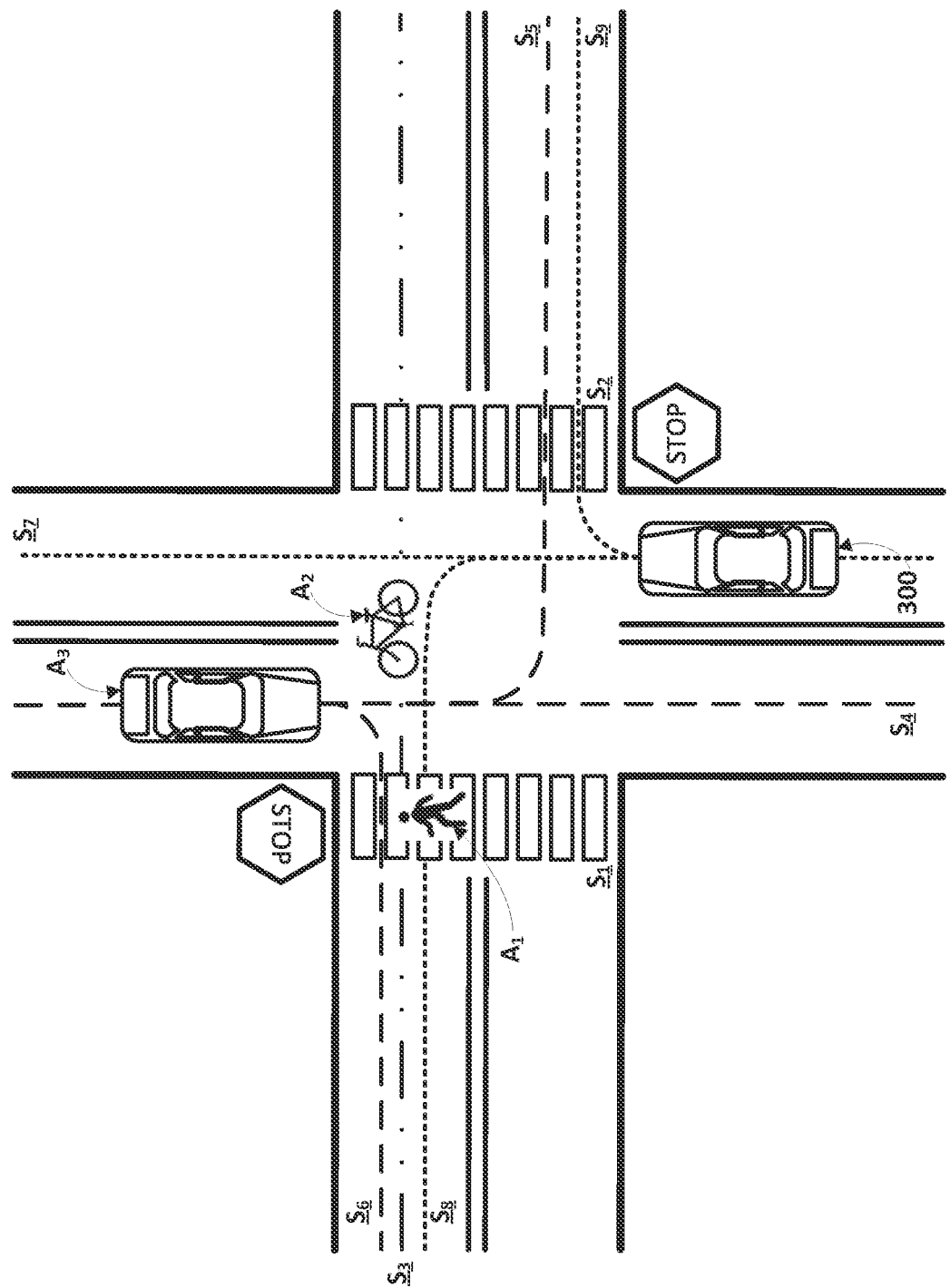

FIGS. 3A, 3B, 3C, 3D, 3E, 3F, 3G, and 3H depict an example of processing a past episode of locomotion of a vehicle 300 for training the layers of the machine learning model(s) of FIG. 2A. Referring initially to FIG. 3A, the environment depicted can be captured by a sensor data instance of sensor data generated by one or more sensors of the vehicle 300 at a given time instance of the past episode of locomotion of the vehicle 300. As shown in FIG. 3A, the environment includes the vehicle 300 at a stop sign of a 4-way intersection where cross traffic does not stop. The vehicle 300 may be an AV (e.g., vehicle 100 of FIG. 1) or a non-AV retrofitted with sensors (e.g., primary sensors 130 of FIG. 1) in a real environment. Although the techniques of FIGS. 3A-3H are described herein with respect to the vehicle 300 being a real vehicle and the past episode of locomotion occurring in a real environment, it should be understood that is for the sake of example and that the vehicle 300 can alternatively be a simulated vehicle that performs the past episode of locomotion in a simulated environment. Further, the environment described throughout FIGS. 3A-3H also includes three additional actors—a pedestrian corresponding to a first actor $A_1$, a bicycle corresponding to a second actor $A_2$, and an additional vehicle corresponding to a third actor $A_3$.

Moreover, the environment shown in FIG. 3A also includes a plurality of streams—$S_1$, $S_2$, $S_3$, $S_4$, $S_5$, $S_6$, $S_7$, $S_8$, and $S_9$. Each of the streams correspond to a sequence of poses representing a candidate navigation path, in the environment of the vehicle 300, for the vehicle 300 or the corresponding additional actors associated with the first actor $A_1$, the second actor $A_2$, the third actor $A_3$, or other additional actors that are not depicted. For example, and with respect to the environment depicted in FIG. 3A, stream $S_1$ corresponds to a crosswalk that is associated with the first actor $A_1$, stream $S_3$ corresponds to a bike lane that is associated with the second actor $A_2$, streams $S_4$, $S_5$, and $S_6$ correspond to lanes of travel for the third actor $A_3$, and streams $S_7$, Sg, and $S_9$ correspond to lanes of travel for the vehicle 300. Although particular streams are depicted in FIG. 3A as being associated with particular actors, it should be understood that those are provided for the sake of example and is not meant to be limiting. For instance, stream $S_2$ corresponds to another crosswalk that is not associated with any actor. Also, for instance, additional streams associated with the actors $A_1$, $A_2$, and $A_3$ may also be included, such as U-turns streams, additional bike lane streams, null streams, and so on.

Each of the streams can be one of a plurality of disparate types of streams that can be dynamically determined based on current and future motion of the vehicle 300. For example, assume that the vehicle 300 will turn left at the four-way intersection and along stream Sg. In this example, stream $S_8$ may be considered a target stream since it is a stream that the vehicle 300 is immediately preparing to follow by turning left at the four-way intersection. Further, stream $S_6$ may be considered a joining stream since it merges into target stream Sg. Although stream $S_6$ is depicted as a distinct stream that does not merge with target stream $S_8$, it should be understood that that is for the sake of clarity. Stream $S_3$ may be considered a joining stream if there is no dedicated bike lane since it merges into target stream $S_8$, or an adjacent stream if there is a dedicated bike lane since it does not merge into target stream $S_8$, but is adjacent to target stream Sg. Further, streams $S_1$, $S_4$, and $S_5$ may be considered crossing streams since these streams transverse target stream Sg. Lastly, streams $S_2$ and $S_7$ may be considered additional streams. In contrast, assume that the vehicle 300 will navigate straight through the four-way intersection depicted in FIG. 3 along stream $S_7$. In this example, stream $S_7$ may be considered a target stream since it is a stream that the vehicle is immediately preparing to follow by turning left at the four-way intersection, and each of the other streams can be defined in a similar manner described above, but with respect to target stream $S_7$.

Figure 3B:
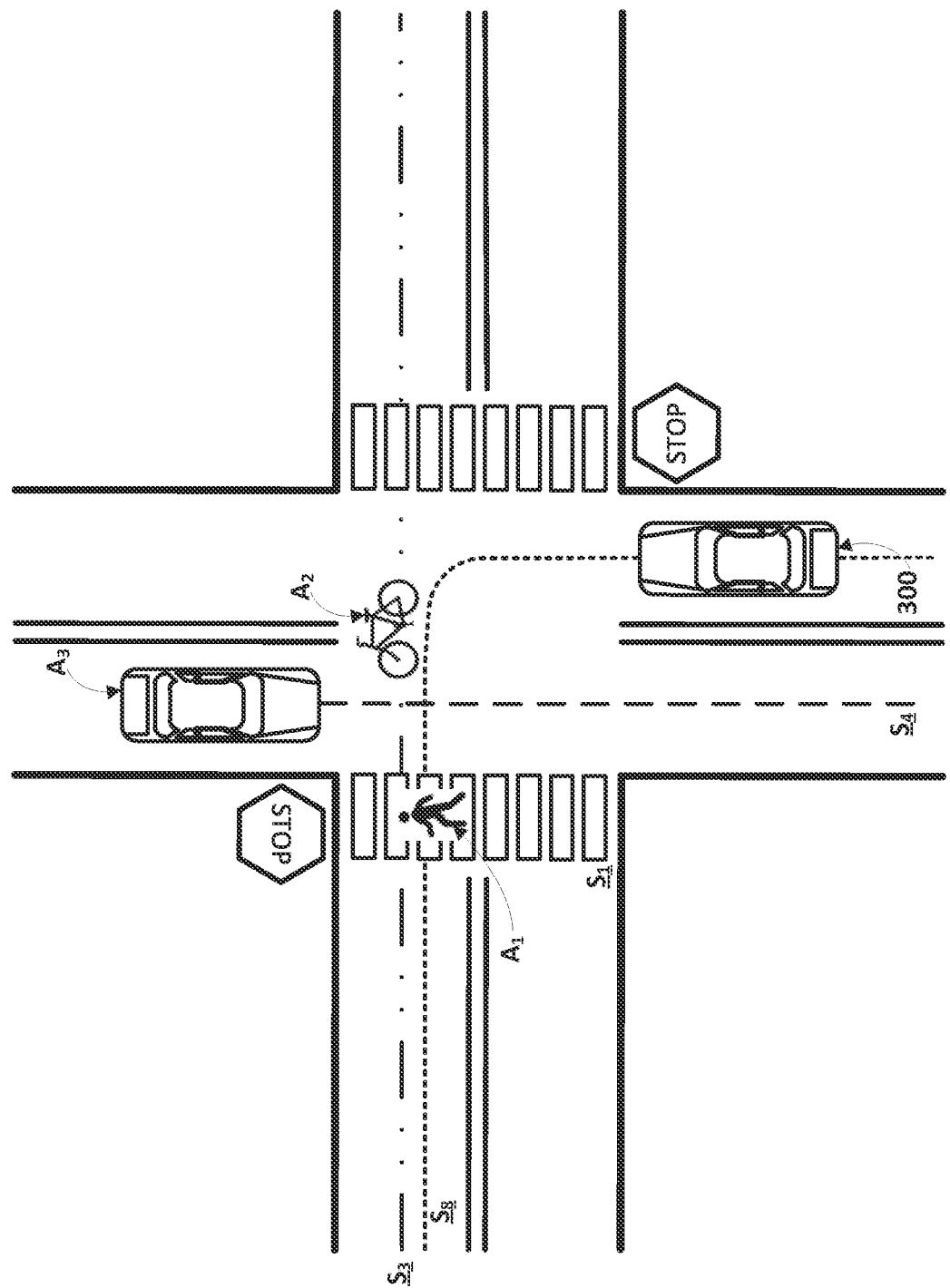

Referring specifically to FIG. 3B, assume that the vehicle 300 will turn left at the intersection along target stream $S_8$, the pedestrian corresponding to the first actor $A_1$ will cross the street along crossing stream $S_1$ as shown, the bicycle corresponding to the second actor $A_2$ will traverse through the intersection along the joining or adjacent stream $S_3$ as shown, and the additional vehicle corresponding to the third actor $A_3$ will navigate straight through the intersection along crossing stream $S_4$ as shown. In this example, further assume that the corresponding additional actors associated with the first actor $A_1$, the second actor $A_2$, and the third actor $A_3$ have a right-of-way over the vehicle 300 in navigating about the four-way intersection depicted in FIG. 3B. In particular, the vehicle 300 is at a stop sign, whereas the pedestrian corresponding to the first actor $A_1$ has already begun to cross the street and the bicycle corresponding to the second actor $A_2$ has already entered the intersection. As such, this reported right-of-way indicates that the vehicle 300 should yield at the stop sign until the pedestrian corresponding to the first actor $A_1$ and the bicycle corresponding to the second actor $A_2$ clear the four-way intersection. Moreover, assume that the additional vehicle corresponding to the third actor $A_3$ arrived at the intersection prior to the vehicle 300. As such, this inferred right-of-way indicates that the vehicle 300 should yield at the stop sign until the additional vehicle corresponding to the third actor $A_3$ clears the four-way intersection. Although the environments of FIG. 3B depicts only a subset of the streams described with respect to FIG. 3A, it should be understood that this is for the sake of clarity and is not meant to be limiting. Moreover, although the vehicle 300 may predict that it should yield at the stop sign to the corresponding additional actors associated with the first actor $A_1$, the second actor $A_2$, and the third actor $A_3$ based on a reported right-of-way, forecasting how the corresponding additional actors associated with the first actor $A_1$, the second actor $A_2$, and the third actor $A_3$ will navigate through the intersection will inform how the vehicle 300 should traverse through the intersection.

In some implementations, one or more ML layers of one or more ML models can be trained to forecast trajectories of the plurality of the actors by iteratively processing the plurality of actors and the plurality of streams from the past episode of locomotion. By iteratively processing the plurality of actors and the plurality of streams from the past episode of locomotion, one or more of the ML layers can be subsequently utilized in controlling an AV. As described herein, FIGS. 3C-3H provide one example of this iterative processing utilized to train one or more of the ML layers based on the environment described with respect to FIG. 3B. As such, it should be understood that the example described with respect to FIGS. 3C-3H is not meant to be limiting and is provided to illustrate techniques described herein. The iterative processing can be performed for a plurality of iterations (e.g., three iterations in the example of FIGS. 3C-3H). In some implementations, a quantity of the plurality of iterations can be a fixed integer (e.g., k iterations, where k is a positive integer), whereas in other implementations, a quantity of the plurality of iterations can be dynamic. In these other implementations, a quantity of the plurality of iterations can be based on one or more of a quantity of the plurality of actors in the environment, a quantity of candidate navigation paths represented by the plurality of streams, or until forecasted trajectories stop changing. Put another way, the quantity of the plurality of iterations in these other implementations can be dynamically determined based on the complexity of the environment. Accordingly, it should be understood that three iterations in the example of FIGS. 3C-3H is provided for the sake of example and is not meant to be limiting.

Initially, at a first iteration, the plurality of actors (e.g., the first actor $A_1$, the second actor $A_2$, and the third actor $A_3$) and the plurality of streams (e.g., at least stream $S_1$, stream $S_3$, stream $S_4$, and stream $S_8$) of the environment can be applied as input across one or more of the ML layers to forecast associated trajectories for each of the plurality of actors and the vehicle 300. In applying the plurality of actors (or features thereof) and the plurality of streams as input across one or more of the ML layers, one or more attention layers included in one or more of the ML layers can be utilized to attention each of the plurality of actors to an associated stream that they are navigating in the environment, and independent of all other actors in the environment depicted in FIG. 3A. For example, a first associated trajectory can be forecast for the pedestrian corresponding to the first actor $A_1$ that indicates the pedestrian will continue walking along the crosswalk corresponding to stream $S_1$, a second associated trajectory can be forecast for the bicycle corresponding to the second actor $A_2$ that indicates the bicycle will continue navigating through the intersection along a bike lane corresponding to stream $S_3$, a third associated trajectory can be forecast for the additional vehicle corresponding to the third actor $A_3$ that indicates the additional vehicle will continue navigating through the intersection along a the lane corresponding to stream $S_4$, and a fourth associated trajectory can be forecast for the vehicle 300 that indicates the vehicle 300 will continue navigating through the intersection along a the lane corresponding to stream $S_8$.

However, through the first iteration, the associated trajectories for the vehicle 300 and each of the corresponding additional actors associated with the first actor $A_1$, the second actor $A_2$, and the third actor $A_3$ fail to consider the associated trajectories of the other actors. For example, and referring to the decision matrix of FIG. 3C, the pedestrian corresponding to the first actor $A_1$ is not yielding to the bicycle corresponding the second actor $A_2$ or the additional vehicle corresponding the third actor $A_3$, the bicycle corresponding to the second actor $A_2$ is not yielding to the pedestrian corresponding the first actor $A_1$ or the additional vehicle corresponding the third actor $A_3$, and the additional vehicle corresponding to the third actor $A_3$ is not yielding to the pedestrian corresponding the first actor $A_1$ or the bicycle corresponding the second actor $A_2$. For example, if the associated trajectories are, in fact, actual trajectories of the corresponding additional actors associated with the first actor $A_1$, the second actor $A_2$, and the third actor $A_3$, then the bicycle corresponding to the corresponding the second actor $A_2$ may collide with the pedestrian corresponding to the first actor $A_1$, which is an unlikely result. Accordingly, in this example, the associated trajectories for the corresponding additional actors associated with the first actor $A_1$, the second actor $A_2$, and the third actor $A_3$ need to be updated to reflect the bicycle corresponding the second actor $A_2$ yielding to the pedestrian corresponding to the first actor $A_1$.

At a second iteration, to update the associated trajectories for the corresponding additional actors associated with the first actor $A_1$, the second actor $A_2$, and the third actor $A_3$, the associated trajectories can be processed using a stream connection function. The steam connection function can correspond to, for example, a hand-engineered or learned function that leverages a previously stored mapping of the environment to generate a plurality of associated trajectories, for the vehicle 300 and for each of the actors, from a perspective of each of the streams. As noted above, the associated trajectories initially generated using one or more of the ML layers can include a first associated trajectory for the first actor $A_1$ with respect to stream $S_1$ (e.g., $[A_1$-$S_1]$), a second associated trajectory for the second actor $A_2$ with respect to stream $S_3$ (e.g., $[A_2$-$S_3]$), a third associated trajectory for the third actor $A_3$ with respect to stream $S_4$ (e.g., $[A_3$-$S_4]$), and a fourth associated trajectory for the vehicle 300 that indicates the vehicle 300 with respect to stream $S_8$ (e.g., $[V$-$S_8]$). However, by processing each of these associated trajectories using the stream connection function, a plurality of associated trajectories for each of these actors can be generated with respect to each of the streams, and without having to explicitly provide geometric features that relate each of these actors in the environment (e.g., lateral distances between these actors, longitudinal distances between these actors, etc.).

For example, in processing the first associated trajectory for the first actor $A_1$ with respect to stream $S_1$ (e.g., $[A_1-S_1]$) using the stream connection function, a plurality of first actor trajectories can be generated, and can include at least the first associated trajectory for the first actor $A_1$ with respect to stream $S_3$ (e.g., $[A_1-S_3]$), the first associated trajectory for the first actor $A_1$ with respect to stream $S_4$ (e.g., $[A_1-S_4]$), and the first associated trajectory for the first actor $A_1$ with respect to stream $S$ (e.g., $[A_1-S_3]$), resulting in the plurality of trajectories for the first actor $A_1$ (e.g., $[A_1-S_1, A_1-S_3, A_1-S_4, A_1-S_8]$). Further, in processing the second associated trajectory for the second actor $A_2$ with respect to stream $S_3$ (e.g., $[A_2-S_3]$) using the stream connection function, a plurality of second actor trajectories can be generated, and can include at least the second associated trajectory for the second actor $A_2$ with respect to stream $S_1$ (e.g., $[A_2-S_1]$), the second associated trajectory for the second actor $A_2$ with respect to stream $S_4$ (e.g., $[A_2-S_4]$), and the second associated trajectory for the second actor $A_2$ with respect to stream $S_8$ (e.g., $[A_2-S_3]$), resulting in the plurality of trajectories for the second actor $A_2$ (e.g., $[A_2-S_1, A_2-S_3, A_2-S_4, A_2-S_8]$). Moreover, in processing the third associated trajectory for the third actor $A_3$ with respect to stream $S_4$ (e.g., $[A_3-S_4]$) using the stream connection function, a plurality of third actor trajectories can be generated, and can include at least the third associated trajectory for the third actor $A_3$ with respect to stream $S_1$ (e.g., $[A_3-S_1]$), the third associated trajectory for the third actor $A_3$ with respect to stream $S_3$ (e.g., $[A_3-S_3]$), and the third associated trajectory for the third actor $A_3$ with respect to stream $S_8$ (e.g., $[A_3-S_8]$), resulting in the plurality of trajectories for the third actor $A_3$ (e.g., $[A_3-S_1, A_3-S_3, A_3-S_4, A_3-S_8]$). Lastly, in processing the fourth associated trajectory for the vehicle 300 with respect to stream $S_8$ (e.g., $[V-S_8]$) using the stream connection function, a plurality of third actor trajectories can be generated, and can include at least the fourth associated trajectory for the vehicle with respect to stream $S_1$ (e.g., $[V-S_1]$), the fourth associated trajectory for the vehicle 300 with respect to stream $S_3$ (e.g., $[V-S_3]$), and the fourth associated trajectory for the vehicle 300 with respect to stream $S_4$ (e.g., $[V-S_4]$), resulting in the plurality of trajectories for the vehicle 300 (e.g., $[V-S_1, V-S_3, V-S_4, V-S_3]$).

Further, at the second iteration, the plurality of trajectories for the first actor $A_1$ (e.g., $[A_1-S_1, A_1-S_3, A_1-S_4, A_1-S_8]$), the plurality of trajectories for the second actor $A_2$ (e.g., $[A_2-S_1, A_2-S_3, A_2-S_4, A_2-S_8]$), the plurality of trajectories for the third actor $A_3$ (e.g., $[A_3-S_1, A_3-S_3, A_3-S_4, A_3-S_8]$), and the plurality of trajectories for the vehicle 300 (e.g., $[V-S_1, V-S_3, V-S_4, V-S_8]$) can be processed using one or more of the ML layers. In processing these associated trajectories, one or more of the ML models can compare them in a pairwise manner to determine new features of the vehicle and one or more of the actors for a given associated trajectory that is relevant to the other associated trajectories, and can update the first associated trajectory for the first actor $A_1$ with respect to stream $S_1$ (e.g., $[A_1-S_1]$), the second associated trajectory for the second actor $A_2$ with respect to stream $S_3$ (e.g., $[A_2-S_3]$), the third associated trajectory for the third actor $A_3$ with respect to stream $S_4$ (e.g., $[A_3-S_4]$), and the fourth associated trajectory for the vehicle 300 that indicates the vehicle 300 with respect to stream $S_8$ (e.g., $[V-S_8]$) based on the features that are determined to be relevant. These new features can include, for example, distance information between each of the actors, relative velocity information between each of the actors, or any other features that can be computed based on comparing the trajectories across multiple frames of reference. For instance, the distance information can include an average distance between each of the vehicle 300, the first actor $A_1$, the second actor $A_2$, and the third actor $A_3$ across the multiple different frames of reference, a closest distance between each of the vehicle 300, the first actor $A_1$, the second actor $A_2$, and the third actor $A_3$, or other distance information that can be determined based on comparing the trajectories for the vehicle 300, the first actor $A_1$, the second actor $A_2$, and the third actor $A_3$ across to multiple different frames of reference. Further, the velocity information can include an average velocity for each of the vehicle 300, the first actor $A_1$, the second actor $A_2$, and the third actor $A_3$, a relative velocity for each of the vehicle 300, the first actor $A_1$, the second actor $A_2$, and the third actor $A_3$, or other distance information that can be determined based on comparing the trajectories for the vehicle 300, the first actor $A_1$, the second actor $A_2$, and the third actor $A_3$.

For example, and referring to the decision matrix of FIG. 3D, the pedestrian corresponding to the first actor $A_1$ is still not yielding to the bicycle corresponding to the second actor $A_2$ or the additional vehicle corresponding to the third actor $A_3$. However, by updating the associated trajectories in this manner, the bicycle corresponding to the second actor $A_2$ is now yielding to the pedestrian corresponding to the first actor $A_1$, but is still not yielding to the additional vehicle corresponding to the third actor $A_3$. Further, the additional vehicle corresponding to the third actor $A_3$ is still not yielding to the pedestrian corresponding to the first actor $A_1$ or the bicycle corresponding to the second actor $A_2$. However, now that the bicycle corresponding to the second actor $A_2$ is yielding to the pedestrian corresponding to the first actor $A_1$ in the intersection, the additional vehicle corresponding to the third actor $A_3$ may collide with the bicycle corresponding to the second actor $A_2$, which is also an unlikely result. Accordingly, in this example, the associated trajectories for the corresponding additional actors associated with the first actor $A_1$, the second actor $A_2$, and the third actor $A_3$ need to be updated again to reflect the additional vehicle corresponding the third actor $A_3$ yielding to the bicycle corresponding to the second actor $A_3$.

At a third iteration, to further update the associated trajectories for the corresponding additional actors associated with the first actor $A_1$, the second actor $A_2$, and the third actor $A_3$, the associated trajectories can be processed using the stream connection function in the same or similar described above with respect to the second iteration to generate a plurality of associated trajectories for each of these actors, but based on the updated associated trajectories. Further, at the third iteration, the plurality of trajectories for the first actor $A_1$, the plurality of trajectories for the second actor $A_2$, the plurality of trajectories for the third actor $A_3$, and the plurality of trajectories for the vehicle 300, that are generated based on updated associated trajectories, can be processed using one or more of the ML layers in the same or similar described above with respect to the second iteration to further update the associated trajectories for each of these actors.

For example, and referring to the decision matrix of FIG. 3E, the pedestrian corresponding to the first actor $A_1$ is still not yielding to the bicycle corresponding to the second actor $A_2$ or the additional vehicle corresponding to the third actor $A_3$. From the second iteration, the bicycle corresponding to the second actor $A_2$ is still yielding to the pedestrian corresponding to the first actor $A_1$, but is still not yielding to the additional vehicle corresponding to the third actor $A_3$. Further, the additional vehicle corresponding to the third actor $A_3$ is now yielding to the bicycle corresponding the second actor $A_2$, and indirectly yielding to the pedestrian corresponding the first actor $A_1$ (e.g., since the additional vehicle is yielding to the bicycle and the bicycle is yielding to the pedestrian) Accordingly, in this example, the associated trajectories for the corresponding additional actors associated with the first actor $A_1$, the second actor $A_2$, and the third actor $A_3$ should accurately reflect how each of these actors will navigate through the intersection.

Notably, at the first iteration, associated trajectories for each of the actors (e.g., the first actor $A_1$, the second actor $A_2$, and the third actor $A_3$, and the vehicle 300) are forecast independent of one another using one or more of the ML layers. As part of a last step of the first iteration or a first step of the second iteration, the stream connection can be utilized to shift a frame of reference for each of the associated trajectories from a respective associated stream that each of the actors are navigating to multiple frames of reference for each of the respective associated streams that each of the actors are navigating by generating the plurality of associated trajectories (and optionally other streams that actors are not navigating). At the second iteration, the plurality of associated trajectories can be processed using one or more of the ML layers to update the associated trajectories by learning about the other actors and how they may constrain motion of one another in the environment (e.g., the pedestrian constraining the motion of the bicycle). However, at this second iteration, the associated trajectories for other actors may still have not learned how their motion may be constrained based on how other actor's motion is constrained by other actors (e.g., not being informed that the additional vehicle will be constrained by the bicycle because the pedestrian constraining the motion of the bicycle). As part of a last step of the second iteration or a first step of the third iteration, the stream connection can be utilized again to shift a frame of reference for each of the updated associated trajectories from the respective associated stream that each of the actors are navigating to the multiple frames of reference for each of the respective associated streams that each of the actors are navigating by generating the plurality of associated trajectories. Accordingly, at this third iteration, the associated trajectories for the other actors may learn how their motion may be constrained based on how other actor's motion is constrained by other actors (e.g., the bicycle constraining the motion of the additional vehicle since the pedestrian is constraining the motion of the bicycle). Throughout these iterations, the associated trajectory for the additional vehicle may be informed that the pedestrian is in the environment, but it is not informed that it's motion will be indirectly constrained by the pedestrian until this third iteration (e.g., indirectly informed as a result of the updated associated trajectory of the bicycle, which is directly constrained by the motion of the pedestrian).

In some implementations, the associated trajectories at a final iteration (e.g., the third iteration in the example of FIGS. 3C-3H) can be utilized as one or more predicted outputs generated using one or more of the ML layers. In additional or alternative implementations, one or more constraints on future motion of the vehicle 300 can be determined based on the associated trajectories at the final iteration, and the one or more constraints can be utilized as the one or more predicted outputs generated using one or more of the ML layers. The one or more vehicle constraints can include, for example, one or more of locational constraint(s) that restrict where the AV can be located in the environment, or temporal constraint(s) that restrict when the AV can perform the future motion in the environment. During training (e.g., as described with respect to FIGS. 2A and 2B), the one or more predicted outputs can be utilized in generating one or more losses for updating one or more of the ML layers. At inference (e.g., as described with respect to FIGS. 4A and 4B), the one or more predicted outputs can be provided to one or more additional ML layers of one or more of the ML models to generate one or more further predicted outputs that are utilized to control an AV.

Figure 3F:
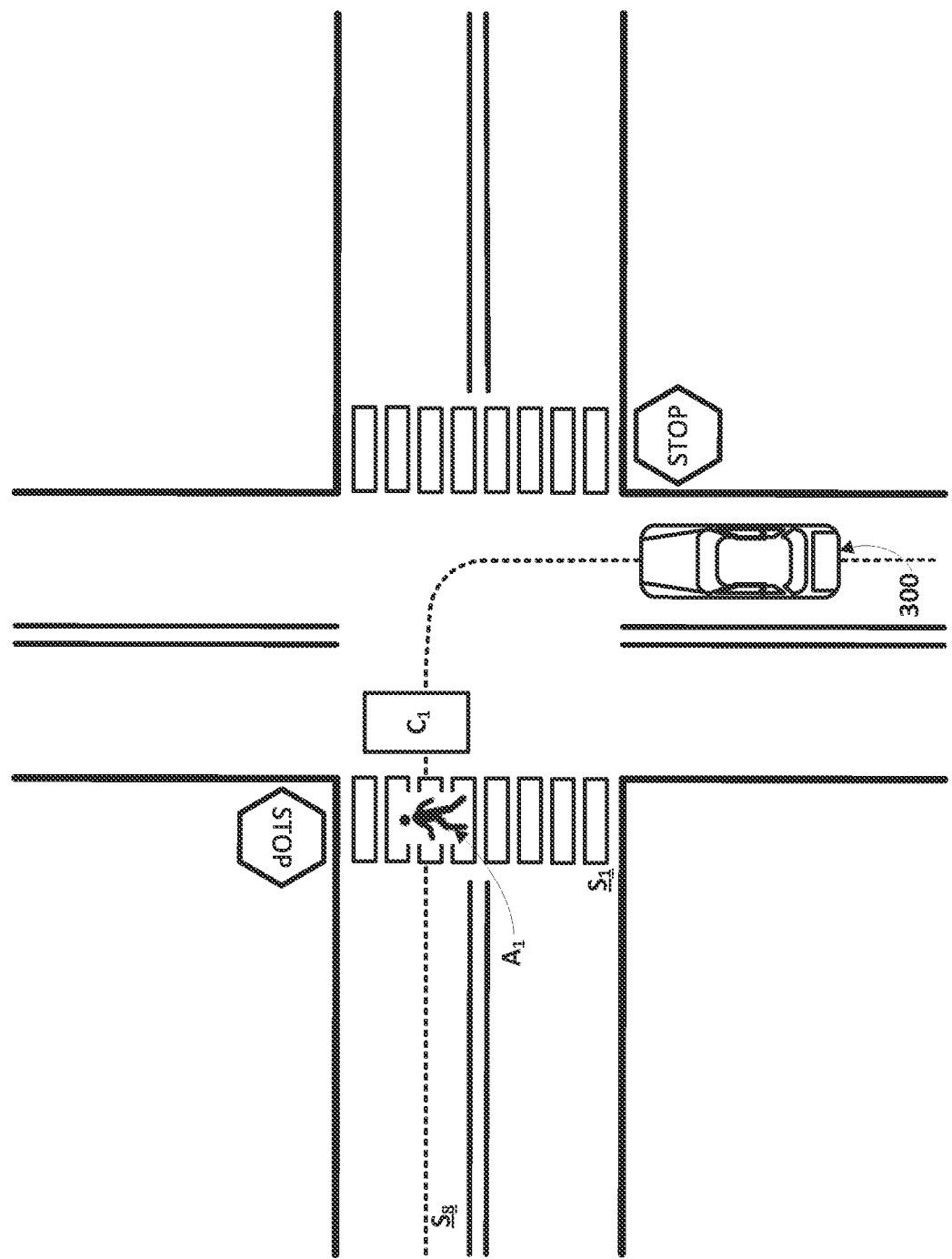
Figure 3G:
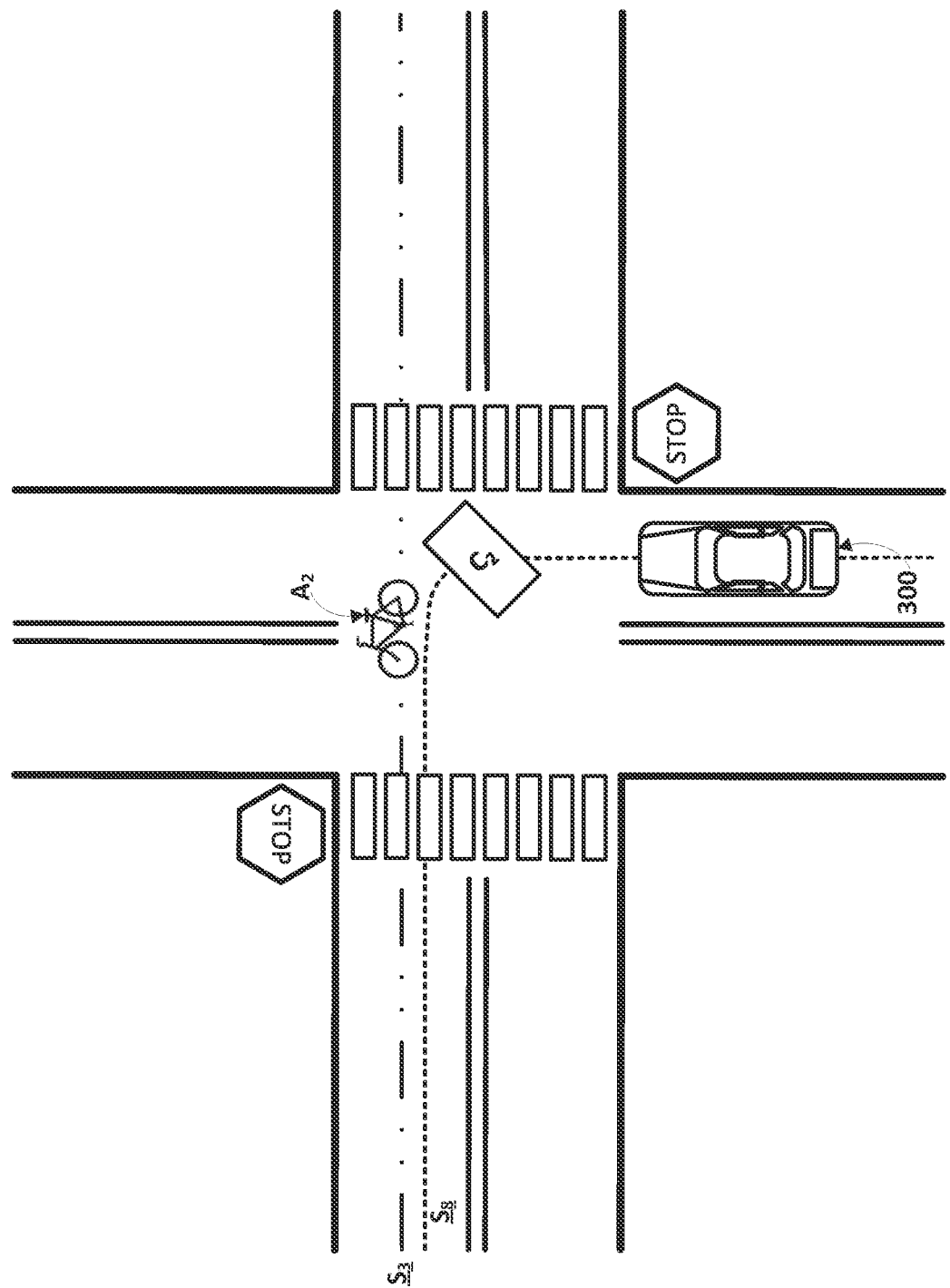

For example, and referring specifically to FIGS. 3F-3H, locational constraints resulting from the associated trajectories of the additional actors in the environment of the vehicle 300 are depicted. With respect to FIG. 3F, a first locational constraint $C_1$ for the vehicle 300 resulting from the associated trajectory of the pedestrian corresponding to the first actor $A_1$ is depicted. The first locational constraint $C_1$ indicates that the vehicle 300 may enter the intersection and nudge into a lane of oncoming traffic, but that the vehicle 300 cannot continue along stream $S_8$ past the crosswalk. Although not depicted, a first temporal constraint can also be determined based on an estimated duration of time for the pedestrian corresponding to the first actor $A_1$ to clear the crosswalk, thereby ensuring the vehicle 300 does not collide with the pedestrian. With respect to FIG. 3G, a second locational constraint $C_2$ for the vehicle 300 resulting from the associated trajectory of the bicycle corresponding to the second actor $A_2$ is depicted. The second locational constraint $C_2$ indicates that the vehicle 300 may partially enter the intersection, but that the vehicle 300 cannot nudge into any lane of oncoming traffic and cannot continue along stream Sg past the first lane crossing the intersection. Although not depicted, a second temporal constraint can also be determined based on an estimated duration of time for the bicycle corresponding to the second actor $A_2$ to clear the intersection, thereby ensuring the vehicle 300 does not collide with the bicycle. With respect to FIG. 3H, a third locational constraint $C_3$ for the vehicle 300 resulting from the associated trajectory of the additional vehicle corresponding to the third actor $A_3$ is depicted. The third locational constraint $C_3$ indicates that the vehicle 300 may enter the intersection, but that the vehicle 300 cannot nudge into any lane of oncoming traffic and cannot continue along stream $S_8$ past any lane of oncoming traffic. Although not depicted, a third temporal constraint can also be determined based on an estimated duration of time for the additional vehicle corresponding to the third actor $A_2$ to clear the intersection, thereby ensuring the vehicle 300 does not collide with the additional vehicle.

In determining the one or more constraints on the vehicle 300 for the one or more predicted outputs, one or more of the locational and temporal constraints resulting from the associated trajectories of each of the corresponding additional actors associated with the first actor $A_1$, the second actor $A_2$, and the third actor $A_3$ can be considered. In some implementations, the most constraining constraints can be utilized as the one or more predicted outputs (e.g., one or more of the second locational constraint $C_2$ resulting from the associated trajectory of the bicycle corresponding to the second actor $A_2$, or the temporal constraint resulting from the associated trajectory of the additional vehicle corresponding to the third actor $A_3$). In additional or alternative implementations, one or more of the locational and temporal constraints can be processed, using one or more of the ML layers, to determine one or more of the constraints as a function of each of the constraints from FIGS. 3F-3H that considers the fact each of the additional actors are dynamic in the environment.

Figure 4A:
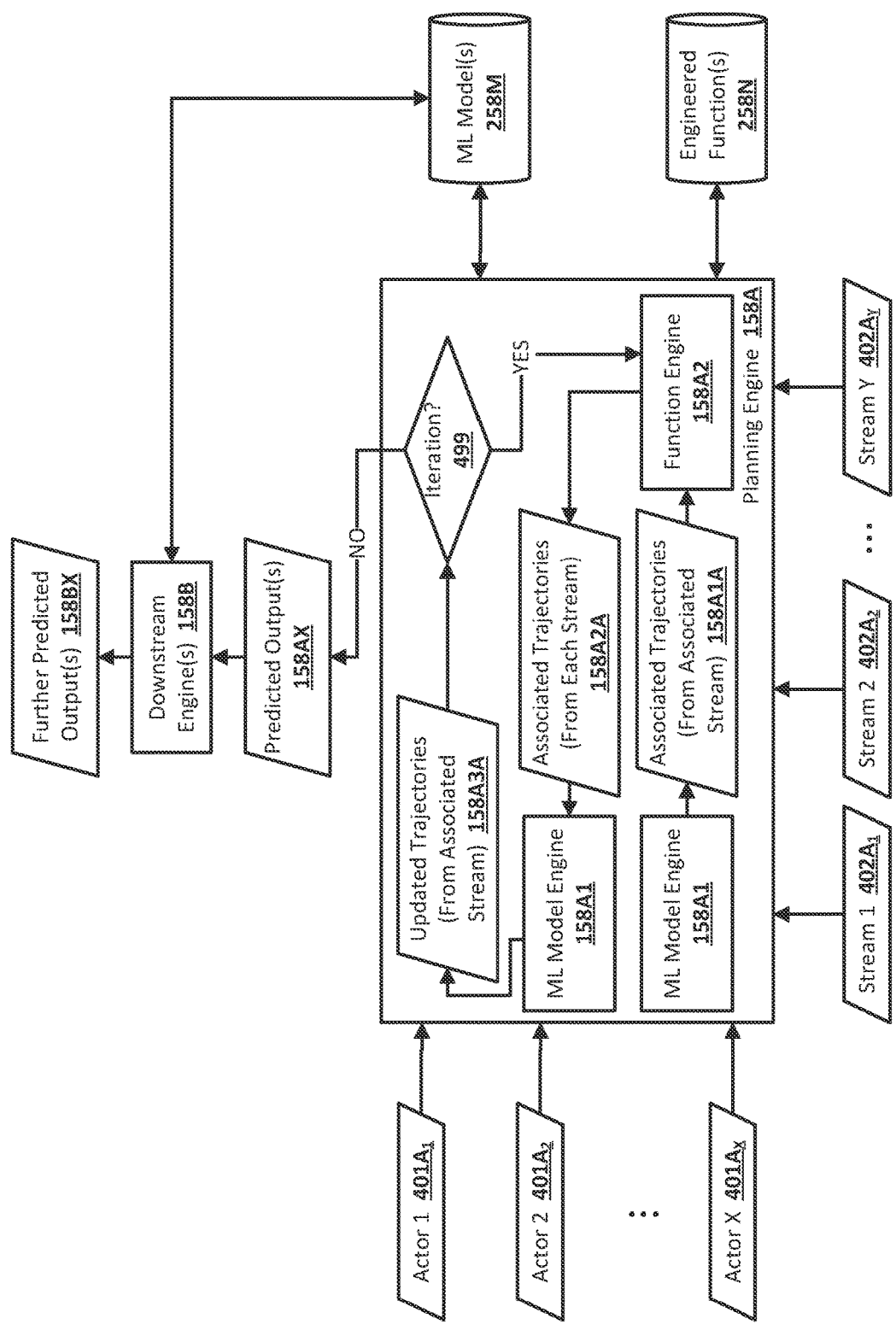
FIG. 4A and FIG. 4B are block diagrams illustrating example architectures for using the trained machine learning layer(s) of the machine learning model(s) of FIG. 2A in controlling an autonomous vehicle, in accordance with various implementations.
Figure 4B:
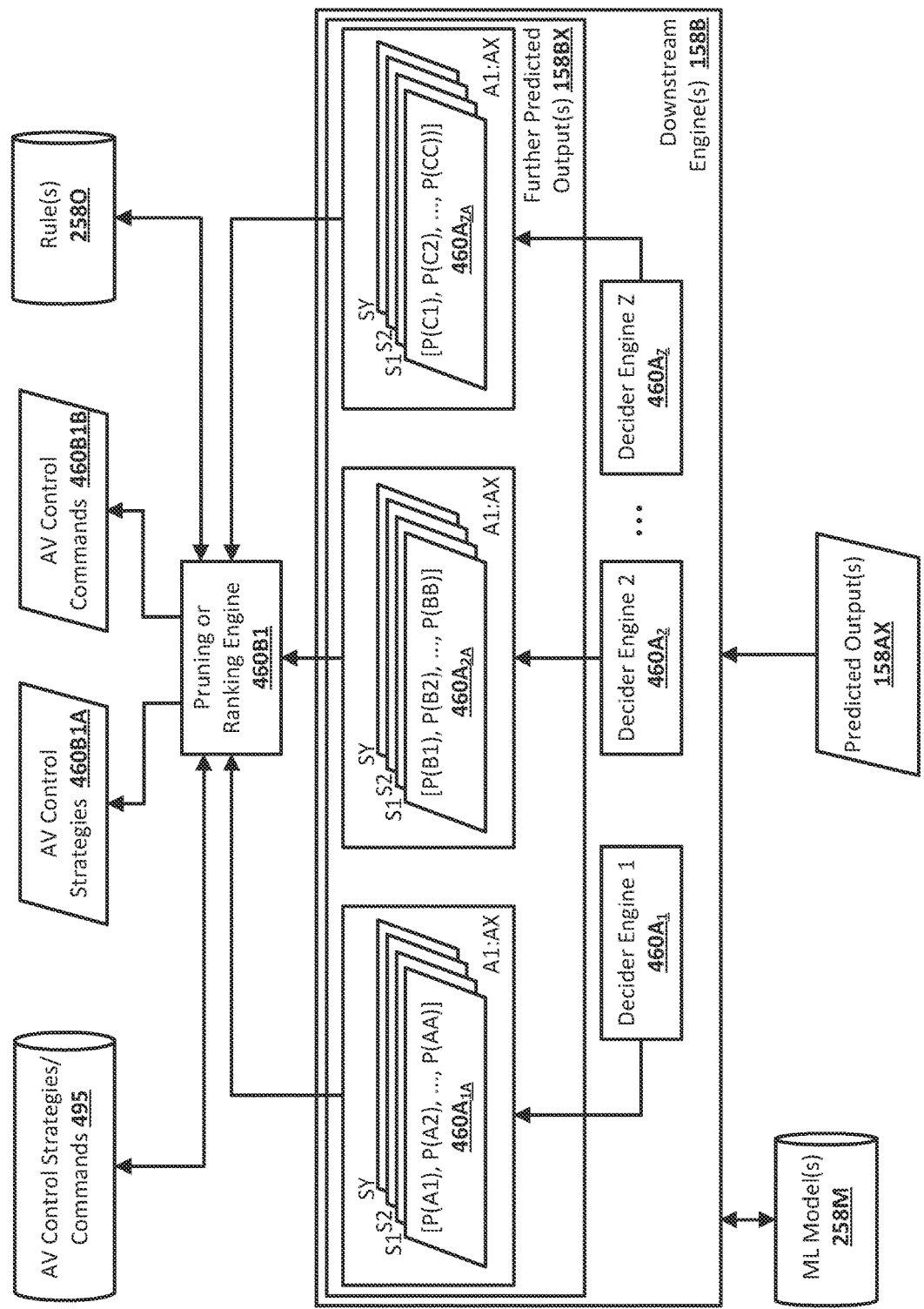

FIGS. 4A and 4B depict block diagrams illustrating example architectures for using the trained ML layer(s) of the ML model(s) of FIG. 2A in controlling an AV. Planning engine 158A can process, using one or more of the ML layers of one or more of the ML model(s) stored in ML model(s) database 258M, a plurality of actors and a plurality of streams to generate one or more predicted output(s) 158AX. For instance, an environment of an AV can be identified based on sensor data generated by one or more sensors of the AV, and the plurality of actors can be captured in the sensor data. The plurality of streams can be identified (e.g., from a prior mapping of the environment accessed via mapping subsystem 162 of FIG. 1) based on the environment or the plurality of actors captured in the environment. In some implementations, the plurality of actors (or features thereof) and the plurality of streams can be represented as a tensor of values, such as a vector or matrix of real numbers corresponding to the features of the plurality of actors and the plurality of streams. Further, one or more downstream engines 158B can process, using one or more additional ML layers of one or more of the ML models stored in ML model(s) database 258M, the one or more predicted outputs 158AX to generate one or more further predicted outputs 158BX.

For example, as shown in FIG. 4A, the plurality of actors can include Actor 1 $401A_1$, Actor 2 $401A_2$, and so on through Actor X $401A_X$, where X is a positive integer corresponding to a quantity of actors in the environment of the AV. Further, the plurality of streams can include Stream 1 $402A_1$, Stream 2 $402A_2$, and so on through Stream Y $402A_Y$, where Y is a positive integer corresponding to a quantity of candidate navigation paths in the environment of the AV. In some implementations, the plurality of actors (or features thereof) and the plurality of streams can be processed, using one or more of the ML layers of one or more the ML models trained according to techniques described herein (e.g., with respect to FIGS. 2A, 2B, and 3A-3H), in a parallelized manner as shown in FIG. 4A. In processing the plurality of actors (or features thereof) and the plurality of streams in a parallelized manner, one or more of the ML layers can iteratively generate and update trajectories of the AV and each of the plurality of actors in the environment of the AV.

In some implementations, the plurality of actors and the plurality of streams can be processed by ML model engine 158A1 of the planning engine 158A to generate associated trajectories 158A1A for the AV and for each of the plurality of actors. The ML model engine 158A1 can process the plurality of actors and the plurality of streams using one or more ML layers of one or more ML models (e.g., stored in the ML model(s) database 258M) that are trained according to techniques described herein (e.g., with respect to FIGS. 2A, 2B, 3A-3H, 5, and 6). Notably, each of the associated trajectories 158A1A are initially forecast with respect to an associated stream being navigated by the actor. For instance, if the AV is navigating along a first stream, then an associated trajectory for the AV can be forecast with respect to the first stream. Further, if an additional actor in the environment of the AV is navigating along a distinct second stream, then an associated trajectory for the additional vehicle can be forecast with respect to the second stream. Moreover, if a further additional actor in the environment of the AV is also navigating along a distinct third stream, then an associated trajectory for the further additional vehicle can be forecast with respect to the third stream. In other words, the AV can independently forecast each of the associated trajectories for each of the actors with respect to a respective associated stream, of the plurality of streams, that is being navigated by the respective actors (e.g., hence the (From Associated Stream)).

Further, the associated trajectories 158A1A can be processed by function engine 158A2 of the planning engine 158A to generate associated trajectories 158A2A for the AV and for each of the plurality of actors. The function engine 158A2 can process the associated trajectories 158A1A using a stream connection function (e.g., stored in the engineered function(s) database 258N or corresponding to one or more ML layer(s) of the ML model(s) as described with respect to FIGS. 2A and 2B). Notably, each of the associated trajectories 158A2A are forecast with respect to each of the streams in the environment. For instance, if the AV is navigating along a first stream, then the associated trajectory (e.g., included in 158A1A) generated for the AV can be initially forecast with respect to the first stream using one or more of the ML layers, and a plurality of additional associated trajectories (e.g., included in 158A2A) generated for the AV can be additionally forecast with respect to all the other streams in the environment (and optionally limited to one or more of streams that are associated with other actors in the environment) using the stream connection function. Further, if an additional actor in the environment of the AV is navigating along a distinct second stream, then the associated trajectory (e.g., included in 158A1A) generated for the additional vehicle can be initially forecast with respect to the second stream using one or more of the ML layers, and a plurality of additional associated trajectories (e.g., included in 158A2A) generated for the additional vehicle can be additionally forecast with respect to all the other streams in the environment (and optionally limited to one or more of streams that are associated with other actors in the environment) using the stream connection function. In other words, the AV can generate associated trajectories from a perspective of each of the other actors in the environment based on the initially generated associated trajectories (e.g., hence the (From Each Stream)).

Moreover, the ML model engine 158A1 can process the associated trajectories 158A2A to generate updated trajectories 158A3A for the autonomous and each of the plurality of actors. The ML model engine 158A1 can process the associated trajectories 158A2A to generate updated trajectories 158A3A using one or more of the ML layers of one or more ML models (e.g., stored in the ML model(s) database 258M) that are trained according to techniques described herein (e.g., with respect to FIGS. 2A, 2B, 3A-3H, 5, and 6). For example, one or more of the attention layers can be utilized to compare each of the associated trajectories 158A2A in a pairwise manner to determine features of the vehicle and one or more of the actors for a given associated trajectory that is relevant to the other associated trajectories, and can generate the updates trajectories 158A3A for the AV and for each of the plurality of actors based on these features (e.g., as described with respect to FIGS. 2A, 2B, 3A-3H, and 6). Although the function engine 158A2 that utilizes the stream connection function stored in the engineered function (s) database 258N is depicted as being separate from the ML model engine 158A1 that utilizes the ML model(s) stored in the ML model(s) database 258M, it should be understood that that is for the sake of clarity and is not meant to be limiting. For example, in some implementations, the stream connection function can correspond to one or more differentiable ML layers of the ML model(s) or any other type of ML layer(s) (that are optionally parameterized) of one or more of the ML model(s) stored in the ML model(s) database 258M. In these examples, the stream connection function is part of one or more of the ML model(s) stored in the ML model(s) database 258M. In additional or alternative implementations, the stream connection function can be external to the ML model(s), but utilized in conjunction with the ML model(s) (e.g., as depicted in FIG. 4A).

The planning engine 158A can execute operations indicated at block 499 to determine whether to perform an additional iteration of this iterative processing. Assuming that it is determined to perform an additional iteration at block 499, the function engine 158A2 can process, using the stream connection function, the updated trajectories 158A3A to generate additional associated trajectories with respect to each of the streams, and the ML model engine 158A1 can process, using one or more of the ML layers, the additional associated trajectories to further update the associated trajectories. This process can be repeated for k iterations, where k is a positive integer. In some implementations, k can be a fixed integer, whereas in other implementations, k can be dynamic. In these other implementations, k can be based on one or more of a quantity of the plurality of actors in the environment, a quantity of candidate navigation paths represented by the plurality of streams, or until forecasted trajectories stop changing. Multiple iterations are described in more detail herein (e.g., with respect to FIGS. 3A-3H).

Further, assuming that it is determined not to perform an additional iteration at block 499, one or more predicted outputs 158AX can be determined. In some implementations, the one or more predicted outputs 158AX can include the associated trajectories for the AV and for each of the plurality of actors at a final iteration. In additional or alternative implementations, the one or more predicted outputs 158AX can include one or more constraints (e.g., locational constraints, temporal constraints, or both) that increase a cost of future motion of the AV or that restrict future motion of the AV. The one or more constraints can be determined based on, for example, the associated trajectories of the plurality of actors (e.g., described with respect to FIGS. 3F-3H). In additional or alternative implementations, the one or more predicted outputs 158AX can include a distribution of actions for the vehicle. The distribution of actions can be determined based on, for example, processing the associated trajectories for the vehicle and for each of the plurality of actors using one or more additional ML layers of one or more of the ML models. In additional or alternative implementations, the one or more predicted outputs 158AX can include one or more costs associated with a distribution of actions for the vehicle. The one or more costs associated with the distribution of actions can be determined based on, for example, processing the associated trajectories for the vehicle and for each of the plurality of actors using one or more additional ML layers of one or more of the ML models.

Although multiple instances of the ML model engine 158A1 are depicted in FIG. 4A, it should be understood that is for the sake of clarity and is not meant to be limiting. Moreover, although the function engine 158A2 is depicted separate from the ML model engine 158A1, it should be understood that is for the sake of clarity and is not meant to be limiting. For instance, it should be understood that the planning engine 158A of FIG. 4A can be utilized as part of planning subsystem of FIG. 1 to perform operations described with respect to FIG. 4A.

In some implementations, one or more of the additional ML layers of one or more of the ML model(s) can correspond to a plurality of disparate deciders, and one or more of the downstream engines 158B can process, using each of the plurality of disparate deciders one or more of the predicted outputs 158AX to generate the further output(s) 158B1. For example, as shown in FIG. 4B, the one or more of the downstream engines 158B can include decider engine 1 460A$_1$, decider engine 2 460A$_2$, and so on through decider engine Z 460A$_Z$, where Z is a positive integer corresponding to a quantity of deciders trained for use by the one or more of the downstream engines 158B. Each of the plurality of different deciders can correspond to a respective portion of the additional ML layers of the ML model(s) stored in the ML model(s) database 258M, and can be utilized to make a plurality of distinct corresponding decisions based on processing of the output(s) 158A1. For example, a yield decider can correspond to a first portion of the one or more additional ML layers and can be utilized to determine whether the AV should yield based on one or more of the predicted outputs 158AX, a merge decider can correspond to a second portion of the one or more additional ML layers and can be utilized to determine whether the AV should merge based on one or more of the predicted outputs 158AX, a joining stream decider can correspond to a third portion of the one or more additional ML layers and can be utilized to determine whether a given actor is merging into a target stream of the AV based on one or more of the predicted outputs 158AX, a crossing stream decider can correspond to a fourth portion of the one or more additional ML layers and can be utilized to determine whether a given actor is crossing the target stream of the AV based on one or more of the predicted outputs 158AX, and so on for a plurality of additional or alternative decisions. In some implementations, the respective portions of the additional implementations are distinct portions of multiple distinct ML models, whereas in other implementations, the respective portions are distinct portions of the same ML model.

Moreover, each of the plurality of disparate deciders can process the output(s) 158A1 to generate one or more of the further predicted outputs 158BX. In some versions of those implementations, one or more of the further predicted outputs 158BX can include a corresponding probability distribution for each of the streams (e.g., as indicated in FIG. 4B with a corresponding probability distribution associated with S1-SY), and with respect to each of the actors (e.g., as indicated in FIG. 4B by A1:AX). For instance, each of the plurality of disparate deciders can one or more of the predicted outputs 158AX to generate, for each of the actors, a corresponding probability distribution associated with each of the streams. The corresponding probability distributions can each include a respective probability associated with each decision for the respective decider. For example, first further predicted output 460A$_{1A}$, of the one or more further predicted outputs 158BX, generated by decider engine 1 460A$_1$ can include a first probability P(A1) associated with a corresponding decision made by the first decider 460A$_1$, a second probability P(A2) associated with another corresponding decision made by the first decider 460A$_1$, and so on through P(AA) associated with other corresponding decisions made by the first decider 460A$_1$. In some implementations, the first further predicted output 460A$_{1A}$ generated by decider engine 1 460A$_1$ can include these probability distributions for each of the streams, and with respect to each of the actors. In this example, assume the first decider engine 460A$_1$ utilizes one or more of the additional ML layers that correspond to a yield decider that determines whether the AV should yield for a given additional actor based on the stream that the given additional actor corresponding to the given actor is following or is predicted to follow in the future. The first probability P(A1) for the first stream S1, of the first further predicted output $460A_{1A}$, can correspond to a probability that the AV should yield for the given additional actor when navigating along the first stream at a current or future time, and the second probability P(A2) for the first stream, of the first further predicted output $460A_{1A}$, can correspond to a probability that the AV should not yield for the given additional actor when navigating along the first stream at a current or future time. Similar probability distributions for each of the streams, and with respect to each of the actors, can be generated as the first further predicted output $460A_{1A}$. Moreover, each decider can generate probability distributions in a similar manner as one or more of the further predicted outputs 158BX. For example, decider engine 2 $460A_2$ can generate second further predicted output $460A_{2A}$ of one or more of the further predicted outputs 158BX, decider engine Z $460A_Z$ can generate additional further predicted output $460A_{ZA}$ of one or more of the further predicted outputs 158BX, and so on for each of the remaining decider engines.

In some versions of those implementations, pruning or ranking engine 460B1 can process one or more of the further predicted outputs 158BX generated by the plurality of disparate deciders to rank AV control strategies 460B1A or AV control commands 460B1B stored in the AV control strategies/commands database 495. The pruning or ranking engine 460B1 can utilize one or more rules stored in rule(s) database 258O to prune or rank the AV control strategies 460A1A or the AV control commands 460B1B. The rule(s) stored in the rule(s) database 258O can include, for example, one or more ML rules generated by the ML model(s), one or more heuristically defined rules that are defined by one or more humans, or any combination thereof. For example, assume the pruning or ranking engine 460B1 retrieves a list of AV control strategies or AV control commands (e.g., from the AV control strategies/commands database 495). In some of these examples, the pruning or ranking engine 460B1 can process one or more of the further predicted outputs 158BX, using the rule(s) (e.g., stored in the rule(s) database 258O), to prune one or more AV control strategies or AV control commands from the list of AV control strategies or AV control commands until a given one of the AV control strategies or AV control commands remain on the list. The remaining AV control strategy or the remaining AV control commands can be utilized in controlling the AV. In other examples, the pruning or ranking engine 460B1 can process one or more of the further predicted outputs 158BX, using the rule(s) (e.g., stored in the rule(s) database 258O), to rank one or more AV control strategies or AV control commands from the list of AV control strategies or AV control commands, and a highest ranked one of the AV control strategies or AV control commands on the list can be utilized in controlling the AV.

In various implementations, these AV control strategies 460B1A or AV control commands 460B1B can be implemented by, for example, control subsystem 160 of vehicle 100 of FIG. 1. For example, the list of AV control strategies can include, for example, a yield strategy, a merge strategy, a turning strategy, a traffic light strategy, an accelerating strategy, a decelerating strategy, or a constant velocity strategy. In these examples, the AV can implement control commands associated with each of these control strategies. Additionally, or alternatively, the AV control commands can include, for example, a magnitude corresponding to one or more of a velocity component, an acceleration component, a deceleration component, or a steering component. In these examples, the AV can directly implement the control commands. In various implementations, one or more of the further predicted outputs can include one or more the AV control strategies 460B1A or the AV control commands 460B1B, and the pruning or ranking engine 460B1 may be omitted. In various implementations, these AV control strategies 460B1A or AV control commands 460B1B can be determined directly based on the one or more predicted outputs 158AX, and the one or more downstream engines 158B may be omitted.

Figure 5:
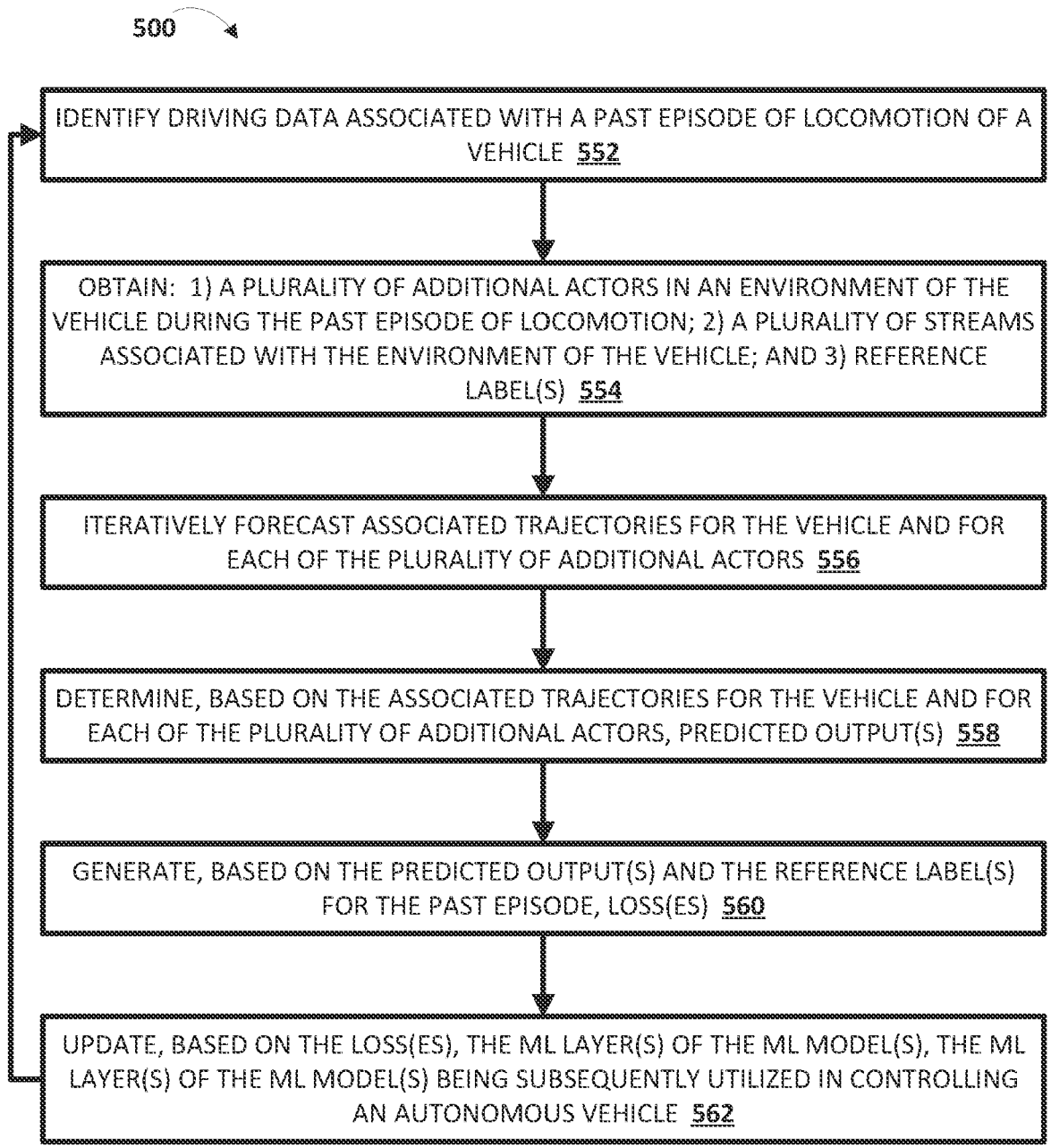
FIG. 5 is a flowchart illustrating an example method of training machine learning layer(s) of machine learning model(s) for use in controlling an autonomous vehicle, in accordance with various implementations.

FIG. 5 depicts a flowchart illustrating an example method 500 of training one or more machine learning (ML) layers of one or more ML models for use in controlling an autonomous vehicle (AV). For convenience, the operations of the method 500 are described with reference to a system that performs the operations. The system may include various components of various devices, including those described with respect to FIGS. 1, 2A, and 2B, server(s), local computing device(s) (e.g., laptop, desktop computer, and so on), other computing systems having memory and processors, or any combination thereof. Moreover, while operations of the method 500 are shown in a particular order, this is not meant to be limiting. One or more operations, elements, or steps may be reordered, omitted, or added.

At block 552, the system identifies driving data associated with a past episode of locomotion of a vehicle. The past episode of locomotion of the vehicle can be captured in the driving data generated by the vehicle during the past episode of locomotion. In some implementations, the driving data can include sensor data generated by sensors of the vehicle during the past episode of locomotion. In some implementations, the driving data can be manual driving data that is captured while a human is driving a vehicle (e.g., an AV or non-AV retrofitted with sensors (e.g., primary sensors 130 of FIG. 1)) in a real environment and in a conventional mode, where the conventional mode represents the vehicle under active physical control of a human operating the vehicle. In other implementations, the driving data can be autonomous driving data that is captured while an AV is driving in a real environment and in an autonomous mode, where the autonomous mode represents the AV being autonomously controlled. In yet other implementations, the driving data can be simulated driving data captured while a virtual human is driving a virtual vehicle in a simulated world.

At block 554, the system obtains data describing: 1) a plurality of additional actors in an environment of the vehicle during the past episode of locomotion; 2) a plurality of streams associated with the environment of the vehicle; and 3) one or more reference labels. The plurality of additional actors can include, for example, additional vehicles that are static in the environment (e.g., a parked vehicle) or dynamic in the environment (e.g., a vehicle merging into a lane of the AV), bicyclists, pedestrians, or any other static or dynamic objects in the environment of the vehicle. In some implementations, the vehicle and each of the plurality of additional actors can be associated with a plurality of features. The features can include, for example, velocity information associated with the vehicle or each of the additional actors, distance information associated with the vehicle or each of the additional actors, and pose information associated with the vehicle or each of the additional actors. The velocity information can include historical, current, and predicted future velocities of the additional actors. The distance information can include one or more of historical, current, and predicted future lateral and longitudinal distances between each of the additional actors, between each of the additional actors and the vehicle, or between the vehicle or each of the additional actors and each of the streams. The pose information can include historical, current, and predicted future position information and orientation information, of the vehicle or each of the actors within the environment of the vehicle.

Further, the plurality of streams may each correspond to a sequence of poses that represent candidate navigation paths, in the environment of the vehicle, for the vehicle or each of the plurality of additional actors. The plurality of streams can be stored in a previously generated mapping of the environment of the vehicle. Each of the plurality of streams can belong to one of multiple disparate types of streams. The multiple disparate types of streams can include, for example, a target stream that the vehicle followed, joining streams that merge with the target stream, crossing streams that transverse the target stream, adjacent streams that are parallel to the target stream, additional streams that are one-hop from any of the other streams, or a null stream. The types of stream, for a given one of the plurality of streams, may be based on a relationship of the plurality of streams to the target stream (e.g., as described above with respect to FIG. 3A).

In some implementations, one or more of the reference labels can be obtained based on user input that defines one or more of the reference labels for the past episode of locomotion. In some additional or alternative implementations, one or more of the reference labels can be generated based on the past episode of locomotion. For example, the system can extract, from the past episode of locomotion, features associated with each of the plurality of additional actors for a corresponding plurality of time instances between a given time instance and a subsequent time instance of the corresponding plurality of time instances. Based on the extracted features, the system can determine one or more control strategies utilized the vehicle at each of the corresponding plurality of time instances, control commands utilized the vehicle at each of the corresponding plurality of time instances, decisions made by various components (e.g., deciders), actions performed by the additional actors in the environment of the vehicle, or other actions or decisions that influence control of the vehicle during the past episode of locomotion of the vehicle, and can generate one or more of the reference labels based on this information (e.g., as described with respect to the training instance engine 258A of FIG. 2A).

At block 556, the system iteratively forecasts associated trajectories for the vehicle and for each of the plurality of additional actors. For example, and referring briefly to FIG. 6, a flowchart illustrating an example method 600 of iteratively forecasting associated trajectories is depicted. For convenience, the operations of the method 600 are described with reference to a system that performs the operations. The system may include various components of various devices, including those described with respect to FIGS. 1, 2A, 2B, 4A, 4B, server(s), local computing device(s) (e.g., laptop, desktop computer, and so on), other computing systems having memory and processors, or any combination thereof. Moreover, while operations of the method 600 are shown in a particular order, this is not meant to be limiting. One or more operations, elements, or steps may be reordered, omitted, or added.

At block 652, the system processes, using one or more of the ML layers of one or more of the ML models, data describing the plurality of actors (e.g., including the autonomous vehicle and each of the plurality of additional actors) and the plurality of streams to generate associated trajectories for the vehicle and for each of the plurality of additional actors, each of the associated trajectories being forecast with respect to a respective associated stream of the plurality of stream. For example, the plurality of actors and the plurality of streams can be applied as input across one or more of the ML layers to forecast associated trajectories for the vehicle and for each of the plurality of actors. In applying the plurality of actors and the plurality of streams as input across one or more of the ML layers, one or more attention layers included in one or more of the ML layers can be utilized to attention each of the plurality of actors to an associated stream that they are navigating in the environment, and independent of all other actors in the environment. For example, assume the vehicle is navigating along a first stream, an additional vehicle is navigating along a second stream, and a pedestrian is navigating along a second stream. In this example, the system can generate the trajectory for the vehicle with respect to the first, the trajectory for the additional vehicle with respect to the second stream, and the trajectory for the pedestrian with respect to the third stream.

At block 654, the system processes, using a stream connection function, the associated trajectories, for the vehicle and for each of the plurality of additional actors, to forecast each of the associated trajectories with respect to each of the respective associated streams. Continuing with the above example, the system can utilize the stream connection function to generate a plurality of associated trajectories, for the vehicle and for each of the plurality of additional actors, with respect to each of the respective associated streams by leveraging the initially forecast trajectories and a previously mapping of the environment (e.g., via the stream connection function). Put another way, the trajectory for the vehicle that is forecast with respect to the first stream can be processed using the stream connection function to generate another trajectory for the vehicle that is forecast with respect to the second stream (e.g., that is being navigated by the additional vehicle) and another trajectory for the vehicle that is forecast with respect to the third stream (e.g., that is being navigated by the pedestrian). As a result, the trajectories for the vehicle are shifted into frames of reference of each of the additional actors in the environment (e.g., as described with respect to FIGS. 3A-3H). Notably, the trajectories for the additional vehicle and the pedestrian can be processed using the stream connection function in the same or similar manner to shift their trajectories into the frame of reference of the vehicle and the frames of reference of one another.

At block 656, the system determines one or more new features, for the vehicle and for each of the plurality of additional actors, based on the associated trajectories forecast with respect to each of the respective associated streams. These new features can include, for example, and with respect to one or more of the frames of reference, distance information between each of the actors, relative velocity information between each of the actors, or any other features that can be computed based on comparing the trajectories across the multiple frames of reference. Continuing with the above example, the system can compare the trajectories from the different frames of reference in a pairwise manner to determine the one or more new features for the vehicle and for each of the additional actors. For instance, the system can align the trajectory of the vehicle with respect to the first stream, the trajectory of the additional vehicle with respect to the first stream, and the trajectory of the pedestrian with respect to the first stream. The system can compare each of these trajectories in, for example, a pairwise manner to determine a closest distance between each of the actors along the trajectories (e.g., vehicle-additional vehicle, vehicle-pedestrian, additional vehicle-pedestrian, etc.), an average distance between each of the actors along the trajectories (e.g., vehicle-additional vehicle, vehicle-pedestrian, additional vehicle-pedestrian, etc.), a furthest distance between each of the actors along the trajectories (e.g., vehicle-additional vehicle, vehicle-pedestrian, additional vehicle-pedestrian, etc.), an average velocity between each of the actors along the trajectories (e.g., vehicle-additional vehicle, vehicle-pedestrian, additional vehicle-pedestrian, etc.), a relative velocity between each of the actors along the trajectories (e.g., vehicle-additional vehicle, vehicle-pedestrian, additional vehicle-pedestrian, etc.), or other new features that can be determined based on comparing the trajectories across the multiple different frames of reference.

At block 658, the system processes, using one or more of the ML layers of one or more of the ML models, the associated trajectories and the one or more new features, for the vehicle and for each of the plurality of actors that are forecast with respect to each of the respective associated streams, to update the associated trajectories, for the vehicle and for each of the plurality of actors, each of the updated associated trajectories being forecast with respect to the respective associated stream. Continuing with the above example, further assume the additional vehicle is an adjacent lane of oncoming traffic towards the vehicle and nudges around the pedestrian crossing over into a lane of the vehicle. In this example, the trajectory for the additional vehicle can be updated to indicate the additional vehicle will nudge around the pedestrian and into the oncoming lane of traffic to avoid colliding with the pedestrian. However, the system may not update the trajectory for the vehicle to reflect that it should slow down since the additional vehicle will nudge into the oncoming lane of traffic. In some implementations, the system may designate each of the plurality of streams as being one or more of: the target stream, the joining stream, the crossing stream, the adjacent stream, the additional stream, or the null stream. Put another way, based on the updated associated trajectories, the system may determine how the streams of each of the additional actors are defined with respect to the target stream being navigated by the vehicle.

At block 660, the system determines whether to perform an additional iteration to update the associated trajectories. In some implementations, a quantity of iterations performed by the system can be a fixed integer, whereas in other implementations, the quantity of iterations performed by the system can be dynamic. In these other implementations, the quantity of iterations can be based on one or more of a quantity of the plurality of actors in the environment, a quantity of candidate navigation paths represented by the plurality of streams, or until the forecasted associated trajectories stop changing. If, at an iteration of block 660, the system determines to perform an additional iteration, the system can return to block 654. Continuing with the above example, at a subsequent iteration of the iterative forecasting, the associated trajectory for the vehicle can be updated to indicate it will slow down to avoid colliding with the additional vehicle that will nudge around the pedestrian and into the oncoming lane of traffic based on a similar process described above with respect to blocks 654, 656, and 658 since the trajectory of the additional vehicle has been updated to indicate that it will nudge into the oncoming lane of traffic. However, without performing this subsequent iteration, the associated trajectory, for the vehicle, may not be informed that the vehicle will slow down to allow the additional vehicle to nudge around the pedestrian. Multiple iterations are described in more detail herein (e.g., with respect to FIGS. 3A-3H). If, at an iteration of block 660, the system determines not to perform an additional iteration, the system can proceed to block 662. In some implementations, the system may update the designations for each of the plurality of streams as being one or more of: the target stream, the joining stream, the crossing stream, the adjacent stream, the additional stream, or the null stream. Put another way, based on the updated associated trajectories, the system may initially determine how the streams of each of the additional actors are defined with respect to the target stream being navigated by the vehicle at the first iteration. However, at each additional iteration, the system newly learns more information with respect to how the vehicle and each of the additional actors will interact in the environment. As a result, the designations of one or more of the plurality of streams may be updated to reflect this newly learned information.

Figure 6:
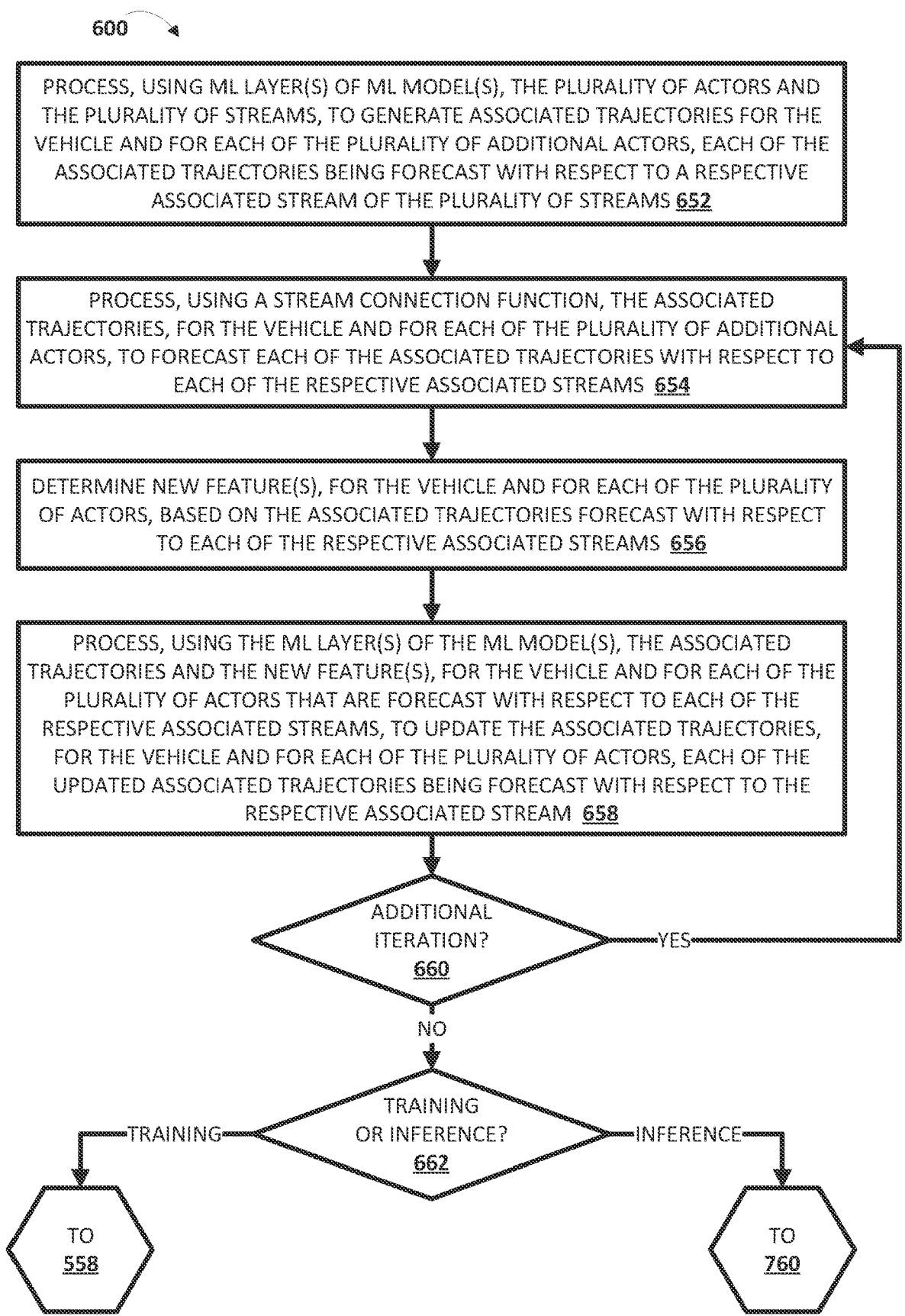
FIG. 6 is a flowchart illustrating an example method of iteratively forecasting associated trajectories, in accordance with various implementations.

At block 662, the system determines whether the method 600 of FIG. 6 was performed during training or inference. If, at an iteration of block 662, the system determines the method 600 of FIG. 6 was performed during training, the system can proceed to block 558 of FIG. 5. If, at an iteration of block 662, the system determines the method 600 of FIG. 6 was performed during inference, the system can proceed to block 760 of FIG. 7. Notably, this determination at block 662 is provided for the sake of clarity of the iterative forecasting and may not be an actual determination made by the system.

Referring back to FIG. 5, at block 558, the system determines, based on the associated trajectories for the vehicle and for each of the plurality of additional actors, one or more predicted outputs. In some implementations, the one or more predicted outputs include the associated trajectories for the vehicle and for each of the plurality of additional actors at a final iteration of the iterative forecasting at block 556. In additional or alternative implementations, the one or more predicted outputs can include one or more constraints (e.g., locational constraints, temporal constraints, or both) that increase a cost of future motion of the vehicle or that restrict future motion of the vehicle. The one or more constraints can be determined based on, for example, the associated trajectories for the vehicle and for each of the plurality of actors (e.g., described with respect to FIGS. 3F-3H). In additional or alternative implementations, the one or more predicted outputs can include a distribution of actions for the vehicle. The distribution of actions can be determined based on, for example, processing the associated trajectories for the vehicle and for each of the plurality of actors using one or more additional ML layers of one or more of the ML models. In additional or alternative implementations, the one or more predicted outputs can include one or more costs associated with a distribution of actions for the vehicle. The one or more costs associated with the distribution of actions can be determined based on, for example, processing the associated trajectories for the vehicle and for each of the plurality of additional actors using one or more additional ML layers of one or more of the ML models.

At block 560, the system generates, based on the one or more predicted outputs and one or more of the reference labels, one or more losses. The one or more losses generated by the system may be based on the one or more predicted outputs generated by the system.

For example, in implementations where the one or more predicted outputs include the associated trajectories for the vehicle and for each of the plurality of actors at a final iteration of the iterative forecasting, the system can compare the associated trajectories to ground truth trajectories of the vehicle and the corresponding additional actors indicated by one or more of the reference labels to generate one or more of the losses. As another example, in implementations where the one or more predicted outputs include one or of the more constraints that increase a cost of future motion of the vehicle or that restrict future motion of the vehicle, the system can compare the one or more constraints on the future motion of the vehicle to one or more ground truth constraints indicated by one or more of the reference labels to generate the one or more losses. As another example, in implementations where the one or more predicted outputs include a distribution of actions for the vehicle, the system can compare the distribution of actions for the vehicle to a ground truth distribution of actions for the vehicle indicated by one or more of the reference labels to generate the one or more losses. As another example, in implementations where the one or more predicted outputs include one or more costs associated with a distribution of actions for the vehicle, the system can compare the one or more costs associated with the distribution of actions for the vehicle to one or more ground truth costs indicated by one or more of the reference labels to generate one or more of the losses.

At block 562, the system updates, based on one or more of the losses, one or more of the ML layers of one or more of the ML models, one or more of the ML layers being subsequently utilized in controlling an autonomous vehicle (AV). For example, the system can backpropagate one or more of the losses across one or more of the ML layers. In some implementations, one or more of the ML layers can be fixed while other ML layers of one or more of the ML layers are updated, whereas in other implementations, each of the one or more ML layers are updated. In implementations where one or more of the ML layers are fixed, the one or more ML layers that are held fixed may be ML layers not utilized in generating one or more of the associated trajectories or the one or more predicted outputs. Further, one or more of the ML layers being subsequently utilized in controlling an AV as described with respect to FIGS. 4A, 4B, and 7.

Figure 7:
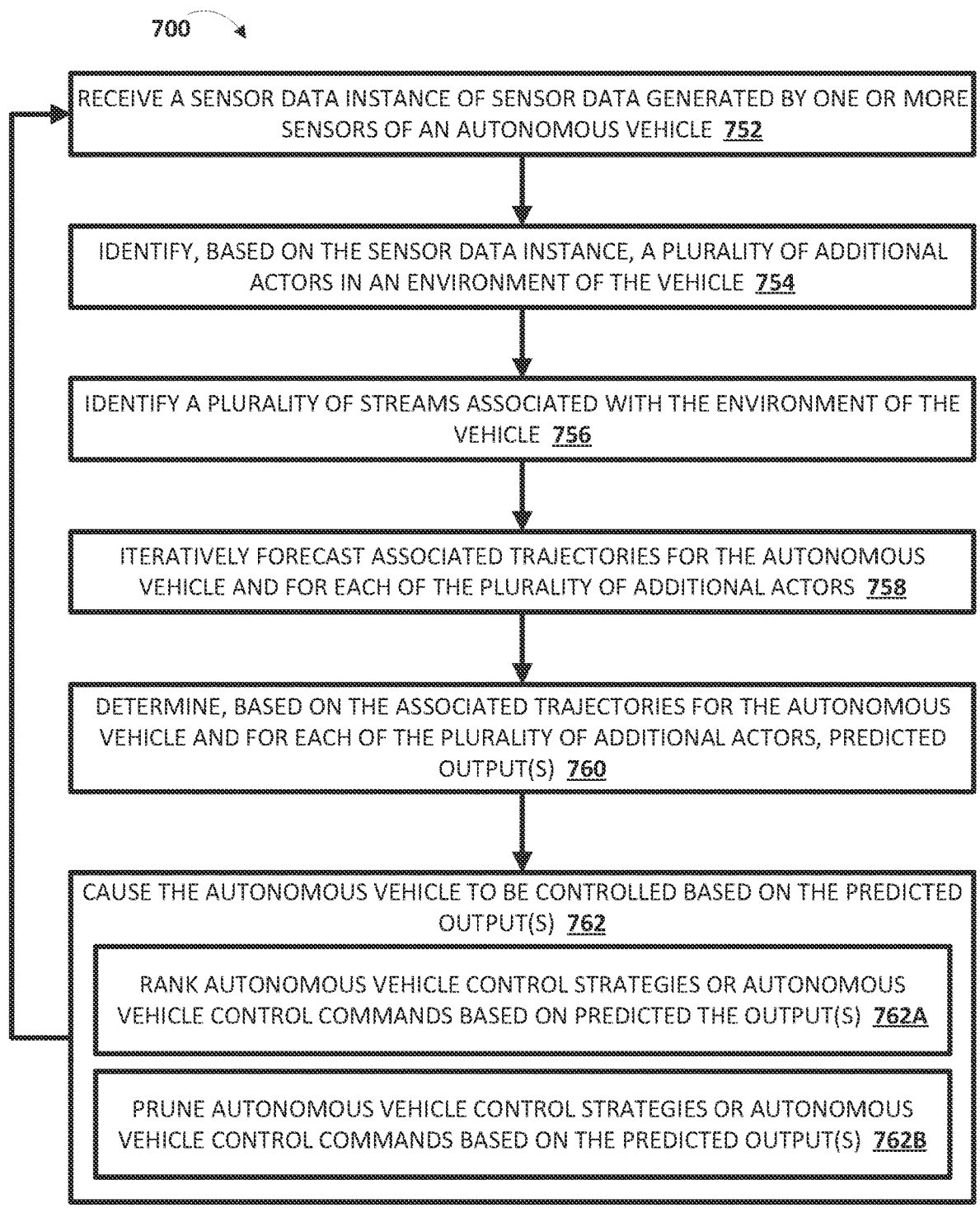
FIG. 7 is a flowchart illustrating an example method of using the trained machine learning layer(s) of the machine learning model(s) of FIG. 5 in controlling an autonomous vehicle, in accordance with various implementations.

FIG. 7 depicts a flowchart illustrating an example method 700 of using one or more of the trained machine learning (ML) layers of one or more of the ML models of FIG. 5 in controlling an autonomous vehicle (AV). For convenience, the operations of the method 500 are described with reference to a system that performs the operations. The system may include various components of various devices, including those described with respect to FIGS. 1, 4A, and 4B, server(s), local computing device(s) (e.g., laptop, desktop computer, and so on), other computing systems having memory and processors, or any combination thereof.

Moreover, while operations of the method 700 are shown in a particular order, this is not meant to be limiting. One or more operations, elements, or steps may be reordered, omitted, or added.

At block 752, the system receives a sensor data instance of sensor data generated by one or more sensors of an AV. The one or more sensors can include, for example, one or more of LIDAR, RADAR, camera(s), or other sensors (e.g., any sensors of primary sensors 130 of FIG. 1). The sensor data can be processed to identify an environment of the AV and to detect objects in the environment of the AV. At block 754, the system identifies, based on the sensor data instance, a plurality of additional actors in an environment of the AV. The environment, and the plurality of additional actors located therein, can be identified based on the sensor data instance. For example, the environment can be identified based on processing sensor data via a localization system (e.g., localization subsystem 152 of FIG. 1). Further, each of the plurality of actors can be identified from an instance of LIDAR data generated by a LIDAR sensor, an instance of RADAR data generated by a RADAR sensor, or an instance of image data generated by other vision component(s) (e.g., the camera(s) or other vision component(s)). At block 756, the system identifies a plurality of streams associated with the environment of the AV. The plurality of streams can be associated with the environment of the AV, and can be identified from a previous mapping of the environment of the AV. The environment of the AV can also be identified based on the sensor data instance (e.g., based on localization of the AV via localization subsystem 152 of FIG. 1).

In some implementations, in identifying the plurality of additional actors and the plurality of streams in the environment of the AV at blocks 754 and 756, the system can identify a plurality of corresponding features associated with each of the plurality of actors based on processing the sensor data. In some implementations, the plurality of features can be defined with respect to each of the plurality of actors. For example, the plurality of features associated with a given actor can include a lateral distance between the given actor and each of the plurality of streams, a lateral distance between the given actor and each of the other actors, a lateral distance between the given actor and one or more lane lines, a longitudinal distance between the given actor and each of the other actors, an absolute velocity of the given actor, a relative velocity of the given actor with respect to each of the other actor s, an acceleration of the given actor, and so on. Further, the plurality of features associated with each of the other actors can include similar features, but with respect to each of the other actors. In some additional or alternative implementations, the plurality of features can be defined with respect to the AV. For example, the plurality of features associated with a given actor can include a lateral distance between the given actor and the AV, a longitudinal distance between the given actor and the AV, and a relative velocity of the given actor with respect to the AV.

At block 758, the system iteratively forecasts associated trajectories for the AV and for the plurality of additional actors. In iteratively forecasting the associated trajectories for the AV and for each of the plurality of actors, the system can implement the method 600 of FIG. 6 as described above. Further, in implementations where the system implements the method 600 of FIG. 6 as part of block 758 of FIG. 7, the system will determine, at block 662 of FIG. 6, that the method 600 of FIG. 6 was implemented during inference and cause the system to proceed to block 760. As noted above with respect to the method 600 of FIG. 6, this determination is provided for the sake of clarity of the iterative forecasting and may not be an actual determination made by the system.

At block 760, the system determines, based on the associated trajectories for the AV and for each of the plurality of additional actors, one or more predicted outputs. In some implementations, the one or more predicted outputs includes the associated trajectories for the AV and for each of the plurality of additional actors at a final iteration of the iterative forecasting at block 758. In additional or alternative implementations, the one or more predicted outputs can include one or more constraints (e.g., locational constraints, temporal constraints, or both) that increase a cost of future motion of the AV or that restrict future motion of the AV. The one or more constraints can be determined based on, for example, the associated trajectories for the AV and for each of the plurality of additional actors (e.g., described with respect to FIGS. 3F-3H). In additional or alternative implementations, the one or more predicted outputs can include a distribution of actions for the vehicle. The distribution of actions can be determined based on, for example, processing the associated trajectories for the vehicle and for each of the plurality of actors (and optionally using one or more additional ML layers of one or more of the ML models). In additional or alternative implementations, the one or more predicted outputs can include one or more costs associated with a distribution of actions for the vehicle. The one or more costs associated with the distribution of actions can be determined based on, for example, processing the associated trajectories for the AV and for each of the plurality of actors using one or more additional ML layers of one or more of the ML models.

At block 762, the system causes the AV to be controlled based on one or more of the predicted outputs. In some implementations, the system can cause the AV to be controlled based directly on the one or more predicted outputs. For example, in implementations where the one or more predicted outputs includes the distribution of actions, an AV control strategy or AV control commands can be determined based directly on the distribution of actions. In additional or alternative implementations, the system can process, using additional ML layers of one or more of the ML models, the one or more predicted outputs to generate the one or more further predicted outputs.

In some implementations, the one or more further predicted outputs can include an AV control strategy or AV control commands that are to be utilized in controlling the AV. In other implementations, the one or more further predicted outputs can include corresponding decisions made by a plurality of disparate deciders, and an AV control strategy or AV control commands that are to be utilized in controlling the AV can be determined based on the corresponding decisions made by the plurality of disparate deciders. In some additional or alternative versions of those implementations, the one or more further predicted outputs can include a corresponding probability distribution associated with each decision made each of the plurality of disparate deciders, and an AV control strategy or AV control commands that are to be utilized in controlling the AV can be determined based on the corresponding probability distributions associated with each decision made each of the plurality of disparate deciders.

In implementations where the one or more further predicted outputs include the AV control strategy or the AV control commands, the system can cause the AV to be controlled based on the AV control strategy or the AV control commands. In implementations where the additional ML layers correspond to the plurality of disparate deciders, block 762 may include optional sub-block 762A or optional sub-block 762B. If included, at sub-block 762A, the system ranks AV control strategies or AV control commands based on the one or more further predicted outputs. If included, at sub-block 762B, the system prunes AV control strategies or AV control commands based on the one or more further predicted outputs. The system can utilize one or more rules to prune or rank the AV control strategies or the AV control commands with respect to a list of AV control strategies or AV control commands.

Other variations will be apparent to those of ordinary skill. Therefore, the invention lies in the claims hereinafter appended.

What is claimed is:

1. A method implemented by one or more processors, the method comprising:
    identifying driving data associated with a past episode of locomotion of a vehicle;
    obtaining, based on the driving data associated with the past episode of locomotion of the vehicle, data describing: (1) a plurality of actors in an environment of the vehicle during the past episode of locomotion of the vehicle, (2) a plurality of streams associated with the environment of the vehicle during the past episode of locomotion of the vehicle, and (3) one or more reference labels for the past episode of locomotion of the vehicle;
    iteratively forecasting, using one or more machine learning (ML) layers of one or more ML models, associated trajectories for the vehicle and for each of the plurality of actors in the environment of the vehicle during the past episode of locomotion of the vehicle;
    determining, based on the associated trajectories for the vehicle and for each of the plurality of actors in the environment of the vehicle during the past episode of locomotion of the vehicle, one or more predicted outputs that are predicted to be utilized for controlling the vehicle in the environment;
    generating, based on comparing the one or more reference labels for the past episode of locomotion of the vehicle and the one or more predicted outputs for controlling the vehicle in the environment, one or more losses; and
    updating, based on the one or more losses, one or more of the ML layers of one or more of the ML models.

2. The method of claim 1, wherein the driving data includes sensor data generated by one or more sensors of the vehicle during the past episode of locomotion of the vehicle, and wherein the driving data is manual driving data captured while a human is manually driving the vehicle during the past episode of locomotion.

3. The method of claim 1, wherein the driving data includes sensor data generated by one or more sensors of the vehicle during the past episode of locomotion of the vehicle, and wherein the driving data is autonomous driving data captured while the vehicle is being autonomously controlled during the past episode of locomotion.

4. The method of claim 1, wherein iteratively forecasting the associated trajectories for the vehicle and for each of the plurality of actors in the environment of the vehicle during the past episode of locomotion of the vehicle and using one or more of the ML layers of one or more of the ML models comprises:
    processing, using one or more of the ML layers of one or more of the ML models, the plurality of actors and the plurality of streams to generate initial associated trajectories for the vehicle and for each of the plurality of actors in the environment of the vehicle, each of the initial associated trajectories being forecast with respect to an associated stream of the plurality of streams; and
    for a plurality of iterations:
        processing, using a stream connection function, the initial associated trajectories for the vehicle and for each of the plurality of actors to further forecast each of the initial associated trajectories with respect to each stream of the plurality of streams; and
        processing, using one or more of the ML layers of one or more of the ML models, the further forecasted initial associated trajectories that are forecast with respect to each stream of the plurality of streams to forecast each of the associated trajectories.

5. The method of claim 4, wherein processing the plurality of actors and the plurality of streams to generate the initial associated trajectories for the vehicle and for each of the plurality of actors in the environment of the vehicle comprises:
processing, using one or more of the ML layers of one or more of the ML models, the plurality of actors and the plurality of streams to generate the initial associated trajectory for a first actor, of the plurality of actors, that forecasts the initial associated trajectory, for the first actor, with respect to a first stream that corresponds to the stream for the first actor;
processing, using one or more of the ML layers of one or more of the ML models, the plurality of actors and the plurality of streams to generate the initial associated trajectory for a second actor, of the plurality of actors and that is in addition to the first actor, that forecasts the initial associated trajectory, for the second actor, with respect to a second stream that corresponds to the stream for the second actor and that is in addition to the first stream; and
processing, using one or more of the ML layers of one or more of the ML models, the plurality of actors and the plurality of streams to generate the initial associated trajectory for the vehicle that forecasts the initial associated trajectory, for the vehicle, with respect to a third stream that corresponds to the stream for the vehicle and that is in addition to both the first stream and the second stream.

6. The method of claim 5, wherein, for the first iteration, of the plurality of iterations, processing the initial associated trajectories for the vehicle and for each of the plurality of actors to further forecast each of the initial associated trajectories with respect to each of the plurality of streams comprises:
processing, using the stream connection function, the initial associated trajectory, for the first actor, to further forecast the initial associated trajectory, for the first actor, with respect to the second stream and the third stream, resulting in a plurality of first actor trajectories that are forecast with respect to each of the first stream, the second stream, and the third stream;
processing, using the stream connection function, the initial associated trajectory, for the second actor, to further forecast the initial associated trajectory, for the second actor, with respect to the first stream and the third stream, resulting in a plurality of second actor trajectories that are forecast with respect to each of the first stream, the second stream, and the third stream; and
processing, using the stream connection function, the initial associated trajectory, for the vehicle, to further forecast the initial associated trajectory, for the vehicle, with respect to the first stream and the second stream, resulting in a plurality of vehicle trajectories that are forecast with respect to each of the first stream, the second stream, and the third stream.

7. The method of claim 6, wherein, for the first iteration, processing the initial associated trajectories to further forecast the initial associated trajectory with respect to the stream comprises:
processing, using one or more of the ML layers of one or more of the ML models, the plurality of first actor trajectories, the plurality of second actor trajectories, and the plurality of vehicle trajectories to update, in parallel, the associated trajectories, wherein forecasting each of the associated trajectories comprises:
updating the associated trajectory, for the first actor, and with respect to the first stream,
updating the associated trajectory, for the second actor, and with respect to the second stream, and
updating the associated trajectory, for the vehicle, and with respect to the third stream.

8. The method of claim 1, wherein determining the one or more predicted outputs that are predicted to be utilized for controlling the vehicle in the environment comprises:
determining one or more predicted vehicle constraints that increase a cost of future motion of the vehicle or that restrict future motion of the vehicle based on the associated trajectories for each of the plurality of actors at a final iteration.

9. The method of claim 8, wherein the one or more predicted vehicle constraints that increase the cost of future motion of the vehicle or that restrict the future motion of the vehicle include one or more of: one or more locational constraints that restrict where the vehicle can be located in the environment, or one or more temporal constraints that restrict when the vehicle can perform the future motion in the environment.

10. The method of claim 1, further comprising:
subsequent to updating one or more of the ML layers of one or more of the ML models based on the one or more losses:
causing one or more of the ML layers of one or more of the ML models to be utilized in controlling an autonomous vehicle.

11. The method of claim 10, wherein causing one or more of the ML layers of one or more of the ML models to be utilized in controlling the autonomous vehicle comprises:
causing one or more of the ML layers of one or more of the ML models to be utilized in generating an autonomous vehicle control strategy for controlling the autonomous vehicle, wherein the autonomous vehicle control strategy includes at least one of: a yield strategy, a merge strategy, a turning strategy, a traffic light strategy, an accelerating strategy, a decelerating strategy, or a constant velocity strategy.

12. The method of claim 10, wherein causing one or more of the ML layers of one or more of the ML models to be utilized in controlling the autonomous vehicle comprises:
causing one or more of the ML layers of one or more of the ML models to be utilized in generating autonomous vehicle control commands for controlling the autonomous vehicle, wherein the autonomous vehicle control commands include a magnitude corresponding to at least one of: a velocity component, an acceleration component, or a steering component.

13. The method of claim 1, wherein each actor, of the plurality of actors, corresponds to one of: an additional vehicle that is in addition to the vehicle, a bicyclist, or a pedestrian.

14. The method of claim 1, wherein each stream, of the plurality of streams, is at least one of:
a target stream associated with a candidate navigation path the vehicle will follow,
a joining stream that merges into the target stream,
a crossing stream that is transverse to the target stream,
an adjacent stream that is parallel to the target stream,
an additional stream that is one-hop from the joining stream, the crossing stream, or the adjacent stream, or
a null stream that is not previously mapped with respect to the target stream or any other stream.

15. A system comprising:
at least one processor; and
memory storing instructions that, when executed by the at least one processor, cause the at least one processor to be operable to:
  identify driving data associated with a past episode of locomotion of a vehicle;
  obtain, based on the driving data associated with the past episode of locomotion of the vehicle, data describing: (1) a plurality of actors in an environment of the vehicle during the past episode of locomotion of the vehicle, (2) a plurality of streams associated with the environment of the vehicle during the past episode of locomotion of the vehicle, and (3) one or more reference labels for the past episode of locomotion of the vehicle;
  iteratively forecast, using one or more machine learning (ML) layers of one or more ML models, associated trajectories for the vehicle and for each of the plurality of actors in the environment of the vehicle during the past episode of locomotion of the vehicle;
  determine, based on the associated trajectories for the vehicle and for each of the plurality of actors in the environment of the vehicle during the past episode of locomotion of the vehicle, one or more predicted outputs for controlling the vehicle in the environment;
  generate, based on comparing the one or more reference labels for the past episode of locomotion of the vehicle and the one or more predicted outputs for controlling the vehicle in the environment, one or more losses; and
  update, based on the one or more losses, one or more of the ML layers of one or more of the ML models.

16. The system of claim 15, wherein, the iteratively forecasting the associated trajectories for the vehicle and for each of the plurality of actors in the environment of the vehicle during the past episode of locomotion of the vehicle and using one or more of the ML layers of one or more of the ML models, the at least one processor is operable to:
  process, using one or more of the ML layers of one or more of the ML models, the plurality of actors and the plurality of streams to generate initial associated trajectories for the vehicle and for each of the plurality of actors in the environment of the vehicle, each of the initial associated trajectories being forecast with respect to an associated stream of the plurality of streams; and
  for a plurality of iterations:
    process, using a stream connection function, the initial associated trajectories for the vehicle and for each of the plurality of actors to further forecast each of the initial associated trajectories with respect to each stream of the plurality of streams; and
    process, using one or more of the ML layers of one or more of the ML models, the further forecasted initial associated trajectories that are forecast with respect to each stream of the plurality of streams to forecast each of the associated trajectories.

17. The system of claim 16, wherein, in processing the plurality of actors and the plurality of streams to generate the initial associated trajectories for the vehicle and for each of the plurality of actors in the environment of the vehicle, the at least one processor is operable to:
  process, using one or more of the ML layers of one or more of the ML models, the plurality of actors and the plurality of streams to generate the initial associated trajectory for a first actor, of the plurality of actors, that forecasts the initial associated trajectory, for the first actor, with respect to a first stream that corresponds to the stream for the first actor;
  process, using one or more of the ML layers of one or more of the ML models, the plurality of actors and the plurality of streams to generate the initial associated trajectory for a second actor, of the plurality of actors and that is in addition to the first actor, that forecasts the initial associated trajectory, for the second actor, with respect to a second stream that corresponds to the stream for the second actor and that is in addition to the first stream; and
  process, using one or more of the ML layers of one or more of the ML models, the plurality of actors and the plurality of streams to generate the initial associated trajectory for the vehicle that forecasts the initial associated trajectory, for the vehicle, with respect to a third stream that corresponds to the stream for the vehicle and that is in addition to both the first stream and the second stream.

18. The system, of claim 17, wherein, for the first iteration, of the plurality of iterations, and in processing the initial associated trajectories for the vehicle and for each of the plurality of actors to further forecast each of the initial associated trajectories with respect to each of the plurality of streams, the at least one processor is operable to:
  process, using the stream connection function, the initial associated trajectory, for the first actor, to further forecast the initial associated trajectory, for the first actor, with respect to the second stream and the third stream, resulting in a plurality of first actor trajectories that are forecast with respect to each of the first stream, the second stream, and the third stream;
  process, using the stream connection function, the initial associated trajectory, for the second actor, to further forecast the initial associated trajectory, for the second actor, with respect to the first stream and the third stream, resulting in a plurality of second actor trajectories that are forecast with respect to each of the first stream, the second stream, and the third stream; and
  process, using the stream connection function, the initial associated trajectory, for the vehicle, to further forecast the initial associated trajectory, for the vehicle, with respect to the first stream and the second stream, resulting in a plurality of vehicle trajectories that are forecast with respect to each of the first stream, the second stream, and the third stream.

19. The system of claim 18, wherein, for the first iteration, and in processing the initial associated trajectories to further forecast the initial associated trajectory with respect to the stream, the at least one processor is operable to:
  process, using one or more of the ML layers of one or more of the ML models, the plurality of first actor trajectories, the plurality of second actor trajectories, and the plurality of vehicle trajectories to update, in parallel, the associated trajectories, wherein, in forecasting each of the associated trajectories, the at least one processor is operable to:
    update the associated trajectory, for the first actor, and with respect to the first stream,
    update the associated trajectory, for the second actor, and with respect to the second stream, and
    update the associated trajectory, for the vehicle, and with respect to the third stream.

20. A non-transitory computer-readable storage medium storing instructions that, when executed by at least one processor, cause the at least one processor to perform operations, the operations comprising:
- identifying driving data associated with a past episode of locomotion of a vehicle;
- obtaining, based on the driving data associated with the past episode of locomotion of the vehicle, data describing: (1) a plurality of actors in an environment of the vehicle during the past episode of locomotion of the vehicle, (2) a plurality of streams associated with the environment of the vehicle during the past episode of locomotion of the vehicle, and (3) one or more reference labels for the past episode of locomotion of the vehicle;
- iteratively forecasting, using one or more machine learning (ML) layers of one or more ML models, associated trajectories for the vehicle and for each of the plurality of actors in the environment of the vehicle during the past episode of locomotion of the vehicle;
- determining, based on the associated trajectories for the vehicle and for each of the plurality of actors in the environment of the vehicle during the past episode of locomotion of the vehicle, one or more predicted outputs for controlling the vehicle in the environment;
- generating, based on comparing the one or more reference labels for the past episode of locomotion of the vehicle and the one or more predicted outputs for controlling the vehicle in the environment, one or more losses; and
- updating, based on the one or more losses, one or more of the ML layers of one or more of the ML models.

* * * * *